United States Patent [19]

Robinson et al.

[11] Patent Number: 5,590,349
[45] Date of Patent: Dec. 31, 1996

[54] REAL TIME PROGRAMMABLE SIGNAL PROCESSOR ARCHITECTURE

[75] Inventors: Jeffrey I. Robinson, New Fairfield; Keith Rouse, Oxford, both of Conn.; Bruce R. Musicus, Arlington, Mass.

[73] Assignee: Logic Devices, Inc., Sunnyvale, Calif.

[21] Appl. No.: 900,536

[22] Filed: Jun. 18, 1992

Related U.S. Application Data

[63] Continuation of Ser. No. 525,977, May 18, 1990, abandoned, which is a continuation-in-part of Ser. No. 217,616, Jul. 11, 1988, Pat. No. 5,068,823.

[51] Int. Cl.$^6$ ............................................. G06F 15/173
[52] U.S. Cl. ............... 395/800; 395/200.03; 364/474.24
[58] Field of Search ............................. 395/800, 200.03, 395/200.19; 364/474.24

[56] References Cited

U.S. PATENT DOCUMENTS

| | | | |
|---|---|---|---|
| 4,257,100 | 3/1981 | Syrbe et al. | 395/182.02 |
| 4,377,849 | 3/1983 | Finger et al. | |
| 4,439,839 | 3/1984 | Kneib et al. | 395/427 |
| 4,631,686 | 12/1986 | Ikawa . | |
| 4,641,238 | 2/1987 | Kneib | 395/290 |
| 4,703,436 | 10/1987 | Varshney . | |
| 4,740,894 | 4/1988 | Lyon | 395/476 |
| 4,748,573 | 5/1988 | Sarandrea et al. | 364/551.01 |
| 4,750,111 | 6/1988 | Crosby, Jr. et al. | 395/550 |
| 4,786,904 | 11/1988 | Graham, III et al. . | |

(List continued on next page.)

OTHER PUBLICATIONS

Denyer et al., "A Silicon Compiler for VLSI Signal Processors," *Digest of Technical Papers, ESS CIRC '82*, (Brussels, Belgium), Sep. 1982, pp. 215–218.

Huisken et al., "Design of DSP Systems on Silicon Using the PIRAMID Library and Design Tools," *VLSI Signal Processing III*, IEEE, NY, 1988, pp. 319–329.

Engels et al., "Concept and Implementation of a Powerful Multiprocessor System for Digital Signal Processing," Internal Report KUL–ESAT–1989, Jan. 4, 1989.

Kevin L. Kloker, "The Motorola DSP 56000 Digital Signal Processor," *IEEE Micro*, Dec. 1986, pp. 29–48.

Paul N. Hilfinger, "A High–Level Language and Silicon Compiler for Digital Signal Processing," *IEEE 1985 Custom Integrated Circuits Conference, Proceedings*, N.Y., May 1985, pp. 213–216.

"Gabriel: A Design Environment for DSP" by Edward A. Lee et al. IEEE Transactions on Acoustics, Speech, & Signal Processing, vol. 37, No. 11, Nov. 1989, pp. 1751–1762.

*Primary Examiner*—William M. Treat
*Attorney, Agent, or Firm*—David P. Gordon

[57] ABSTRACT

A programmable integrated signal processor ("SPROC") is provided having a multiported central memory unit (RAM), a program memory, at least one, and preferably a plurality of digital processors coupled to the multiported RAM and to the program memory, a data flow manager which controls external data flowing into the SPROC and processed data flowing out of the SPROC by acting as an interface of such data with the multiported RAM, input and output ports coupled to the DFM and acting as serial interfaces for the SPROC, and a host port permitting the programming of the SPROC and acting as a parallel interface to the SPROC. SPROCs may be coupled via the input and output ports to provide a system. The SPROC architecture permits the SPROC system to be computationally expandable, to have low latency and parasitic overhead for real time I/O, to efficiently execute a multiple of asynchronous processes, and to easily interface with microprocessors of various formats. The SPROC architecture in conjunction with a compiler and user interface system permits a user to "sketch and realize" complex circuits in the SPROC. An access port coupled to the multiported data RAM and the program RAM is provided for debugging purposes and permits reading and writing to data and program RAM memory locations. A probe permits monitoring of a memory location and provides an analog signal indicative thereof. The SPROC accomplishes for signal processing that which a microprocessor accomplishes for logic processing, and is further also easily realized in silicon.

87 Claims, 14 Drawing Sheets

U.S. PATENT DOCUMENTS

| | | | |
|---|---|---|---|
| 4,791,602 | 12/1988 | Resnick . | |
| 4,792,743 | 12/1988 | Tsujino et al. . | |
| 4,845,633 | 7/1989 | Furtek . | |
| 4,847,757 | 7/1989 | Smith | 395/325 |
| 4,864,381 | 9/1989 | Seefeldt et al. . | |
| 4,868,785 | 9/1989 | Jordan et al. | 395/140 |
| 4,870,302 | 9/1989 | Freeman . | |
| 4,873,630 | 10/1989 | Rusterholz et al. | 395/800 |
| 4,896,272 | 1/1990 | Kurosawa . | |
| 4,935,894 | 6/1990 | Ternes et al. | 395/309 |
| 4,972,314 | 11/1990 | Getzinger et al. | 395/425 |
| 5,031,111 | 7/1991 | Chao et al. | 364/491 |
| 5,042,000 | 8/1991 | Baldwin | 364/726 |
| 5,163,133 | 11/1992 | Morgan et al. | 395/800 |

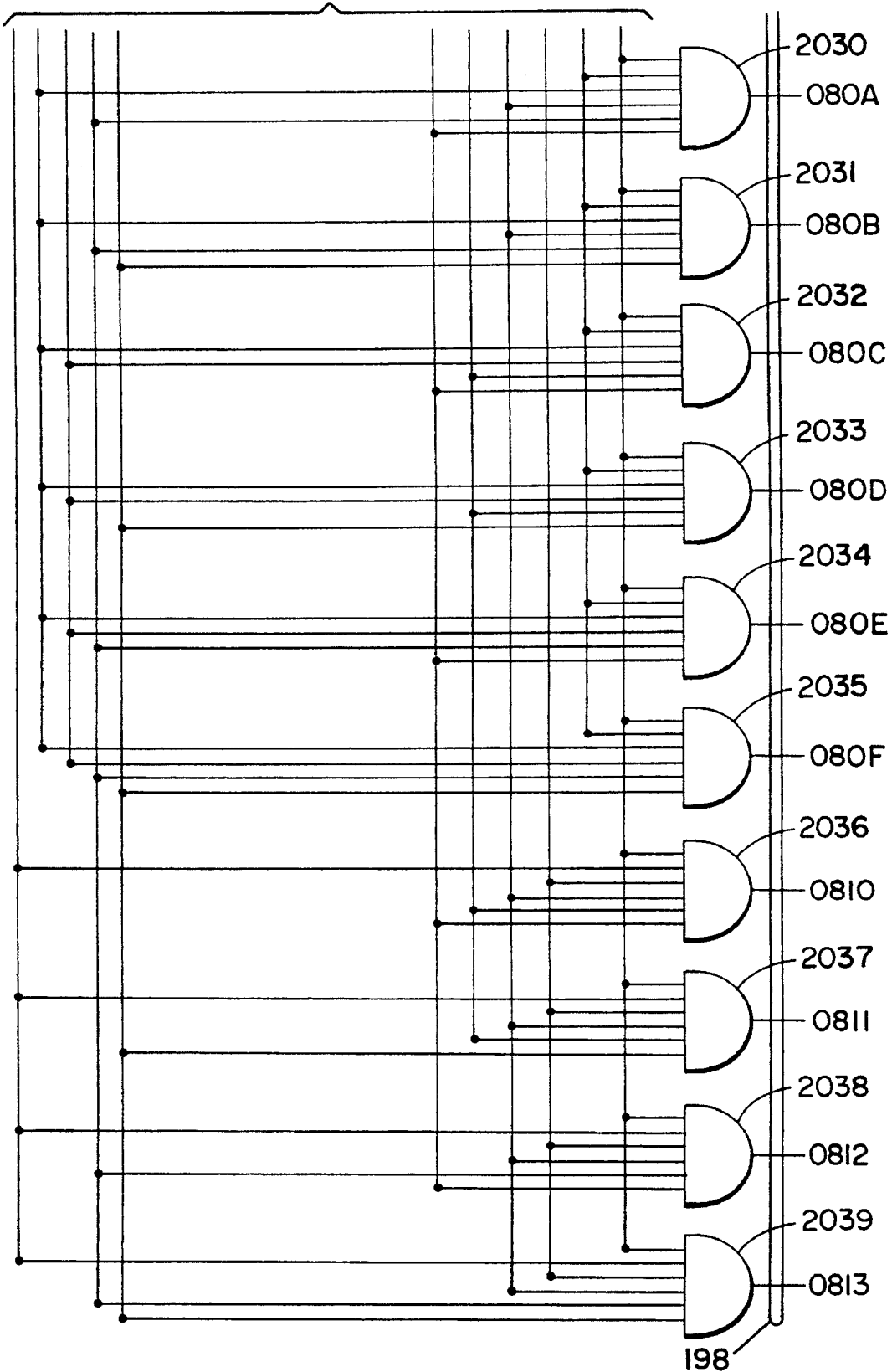

REAL TIME PROGRAMMABLE SIGNAL PROCESSOR ARCHITECTURE

This is a continuation of application Ser. No. 07/525,977 filed on May 18, 1990 now abandoned, which is a continuation-in-part of U.S. Ser. No. 07/217,616 filed Jul. 11, 1988 and now issued as U.S. Pat. No. 5,068,823, and of PCT U.S. Pat. No. 89/02986 filed Jul. 10, 1989.

BACKGROUND OF THE INVENTION

The present invention generally relates to programmable circuit devices. More particularly, the present invention relates to an architecture which permits the instantaneous realization in silicon of a customized signal processing device.

Digital signal processing has evolved from being an expensive, esoteric science used primarily in military applications such as radar systems, image recognition, and the like, to a high growth technology which is used in consumer products such as digital audio and the compact disk. Single chip digital signal processors (SCDSPs) were introduced in the early 1980's to specifically address these markets. However, SCDSPs are complex to design and use, and have significant performance limitations. In particular, SCDSPs are limited to a frequency spectrum from DC to the low tens of KHz. Moreover, most SCDSPs have other development environment and hardware performance problems which stem from their Von Neuman, microprocessor origins.

Generic signal processing based products can be segmented as shown in FIG. 1 and described as follows: analog input/output (I/O), and A/D and/or D/A conversion; signal conditioning and processing; sample rate decision processing; and logic, decision, and control processing. The analog interface (I/O) typically performs preamplification and anti-alias filtering prior to A/D conversion in the input direction, as well as D/A conversion, reconstitution filtering, and power amplification in the output direction. The signal conditioning and processing circuitry conducts precision signal processing functions such as filtering, amplification, rectification, etc., as well as fast Fourier transforms and the like. The sample rate decision circuitry includes window comparators, quantizers, companders, expanders, etc. which make simple logic decisions on each and every sample forwarded to it. Finally, the logic, decision, and control processing circuitry in the incoming direction uses the signals emerging from the signal conditioning and processing and the sample rate decision processing circuitry, and makes decisions to control external equipment in some useful manner. In order to control the external equipment, in the outgoing direction, the logic, decision, and control processing circuitry generates signals which require further signal processing to drive or interact with some analog device or equipment. In making decisions, the logic, decision, and control processing circuitry typically utilizes highly data dependent code which runs asynchronously from the signals it utilizes. Examples of such circuitry include speech and image recognition algorithms, disk drive controllers, speech generation algorithms, numerically controlled machine tool controllers, etc.

Based on the above break-down of tasks it can be seen that SCDSPs are called upon to do both of what may be termed "signal processing" and "logic processing". Signal processing is typically computationally intensive, requires low latency and low parasitic overhead for real time I/O, must efficiently execute multiple asynchronous processes, and be controllable. An example of signal processing would be the processing conducted by a biquad filter. A single biquad filter section might typically require eight data memory words and eighteen program memory words. However, it may require many millions of instructions per second of compute power; i.e. it is computationally, but not memory intensive. The signal processing function is better characterized as an "in line" processor rather than a "terminal" processor; signals flow through the biquad filter at high sample rates and provide input to another section(s). As a result, very high I/O bandwidths are commonly required for the signal processing function. Also, where a multiple of biquad filters are required for a signal processing system, the filters will be asynchronous if they are to process signals having independent sources. In other words, signal processors are often called upon to conduct several processing functions in parallel.

In contrast to signal processing, logic processing is usually memory intensive (as opposed to computationally intensive), must efficiently handle multiple interrupts (particularly in a multiprocessor system), and acts as a controller (as opposed to being controllable). A common type of logic processor is the microprocessor which relies on extensive decision oriented software to conduct its processes. This software is typically written in a high level language such as "C". The code often contains numerous "if... then... else" like constructs which can result in highly variable execution times which are readily dealt with in non-real time applications, but present highly problematic scheduling problems for efficient real time systems.

Comparing the signal and logic processing requirements, it is seen that they are far from similar. Nevertheless, depending upon the circumstances, it is common for logic processors to be called upon to do signal processing, and vice versa. Since the microprocessor art is the older and more developed art, it is not surprising that the architectures of many DSPs have broadly borrowed from the architectures of the microprocessors. Thus, DSPs are often constructed as controllers having an interrupt structure. This type of architecture, however, is not properly suited for the primary functions of digital signal processing.

SUMMARY OF THE INVENTION

It is therefore the primary object of the invention to provide an architecture for a signal processor which is compatible with the requirements of signal processing and which can serve in a capacity for signal processing in a manner in which a microprocessor serves logic processing.

It is another object of the invention to provide a signal processor architecture which is readily capable of considerable computational expansion without significant additional computational overhead.

It is a further object of the invention to provide an architecture for a signal processor having multiple parallel processing elements which do not rely on an interrupt structure, and which may run asynchronously to one another.

Yet a further object of the invention is to provide a signal processor which is efficiently designed to interface with a compiler so as to effect a sketch and realize capability for creating complex signal processing systems.

Another important object of the invention is to provide a signal processor development system useful in the development, evaluation, and debugging of functional blocks of the preferred signal processor system, as well as the preferred signal processor system itself.

In conjunction with the signal processor development system, it is a further object of the invention to provide tools for permitting a designer to interact with the system such that any "node" of the running system may be probed and viewed in analog form, and such that any parameter of any block of the running system may be changed and the effect of that change may be immediately observed.

In accord with the objects of the invention, an integrated signal processor (hereinafter referred to as a "SPROC" which is a trademark of the assignee hereof) with the following architecture is preferably provided: a "multi-ported" central memory unit; at least one program memory; at least one, and preferably a plurality of digital processors coupled to the multiported central memory unit and to the program memory, each digital processor obtaining data from the multiported central memory unit, processing the data according to a program in the program memory, and forwarding processed data to the multiported central memory unit; a data flow manager which controls external data flowing into the SPROC and processed data flowing out of the SPROC by acting as an interface of such data with the multiported central memory unit; input and output ports coupled to the data flow manager and acting as serial interfaces for the SPROC; and a host port for permitting the programming of the SPROC and for acting as a parallel interface to the SPROC. For purposes herein, it is stressed that the term "multiported" as used in conjunction with a memory unit or memory means, RAM, or the like is intended to be read broadly to include memory devices which are truly multiported as well as memory devices which appear to be multiported in that each device connected to the multiported memory believes that it has uncontested access to the multiported memory (i.e. each device having access to the multiported memory is invisible to other such devices, except that the data may be shared). One manner of creating such a multiported central memory unit is to provide time division multiplexed access to a single ported memory unit.

In the preferred SPROC, the program memory is a multiported program RAM which serves all of the processors, and the central memory unit is a multiported data RAM. Also, in the preferred embodiment, an integral boot ROM is provided in conjunction with the integrated signal processor. When the SPROC is in a master mode, the boot ROM stores code which, upon power up, causes one of the processors of the integrated signal processor to seize control of the host port. In master mode, the host port acts as a parallel interface between the SPROC and an EPROM or ROM. The EPROM stores the program code for the program RAM, configuration information for the data flow manager, the parallel host port, the serial ports, and the data RAM, and also data for the data RAM. In the slave mode, the boot ROM is not needed as the SPROC is programmed by a host microprocessor, e.g. an 8096. However, a break ROM which shares memory space with the boot ROM is preferably provided in either master or slave made to run the SPROC when a program break is of effected.

According to other aspects of the invention, an access port and a probe are provided. The access port is coupled to the multiported data RAM and the program RAM and is provided as a means to read and write to data RAM and program RAM memory locations. In this manner, the configuration of the memory may be modified, parameters stored in memory may be modified, and values in all registers which constitute memory locations can be changed. The probe, on the other hand, is a port provided as a means for monitoring the value of data stored at a particular data RAM location. The probe comprises a programmable address decoder which is coupled to, and which monitors, the data RAM bus. The probe captures data written to the programmed location of the multiported data RAM.

The architecture of the SPROC permits a plurality of such integrated signal processors to be coupled together to create a system. Each integrated signal processor is then capable of communicating with another integrated signal processor via serial busses connecting their serial ports, and/or via the parallel host bus.

With the disclosed architecture, an integrated signal processor is provided which meets all of the requirements set forth in the Background section above. First, the integrated signal processor is computationally expandable as a plurality of integrated signal processors may be linked into a system. Second, the integrated signal processor has low latency and parasitic overhead for real time I/O, as the data flow manager insures that the internal processors are free of the task of servicing signal I/O. As a result, the processing power available for useful signal processing activity is significantly larger than a similar system which must handle interrupts for I/O, and higher sampling rates are therefore attainable. Third, the integrated signal processor can efficiently execute a multiple of asynchronous processes as each of the internal processors may be allocated on an as needed basis to various signal paths set up through the apparatus. The physical separation between the multiple internal processors overcomes the normal shared hardware problems while the finer granularity of processing power makes the programming solution efficient. Moreover, for synchronous processes, the multiple internal processors provides a compiler with more partitioning schemes, thereby permitting improved use of the available memory and processing power. Finally, and importantly, the integrated signal processor is controllable in that it can be easily interface to a logic processor (i.e. microprocessor)

According to another aspect of the invention, the provided integrated signal processor is provided with a development system. The development system permits a "sketch and realize" capability in conjunction with the SPROC. In particular, a schematic entry system is provided along with a cell library of parameterizable signal processing functions. Among the functions provided are: multiplier, summing junction, amplifier, integrator, phase locked loop, IIR filter, FIR filter, FFT, rectifiers, comparators, limiters, oscillators, waveform generators, etc. A programming language is also provided to permit the user to define their own functions. The user of the development system has a choice of numerous icons (functional blocks), which through the use of a computer mouse, can be placed on a screen and coupled together in a block diagram format as desired. Each icon relates to a signal processing function in the cell library, and the user is be able to parameterize each block. When the user schematic is complete, the development system automatically compiles the information in an optimized manner, and downloads the program (which realizes the sketched diagram) via an RS232 link coupled via interface circuitry to the host or access ports of one or more SPROCs. The compiler not only produces automatic code for the SPROC(s), but also a symbol table listing all of the defined variables together with their internal addresses in the data RAMs. Writing to those addresses will then change the values of those parameters. For example, if a write is made to the address corresponding to "gain", the gain of the amplifier will change to the new value.

Once the SPROC is programmed, the development system permits the user to interactively debug the device. A probe is positioned via a command line editor on the development system. Typing in the name of a node on the schematic (block diagram), "moves" the probe to that point. The output of this probe is monitorable by an oscilloscope attached to a fixed pin of the SPROC. Similarly, the command line editor may be used to modify parameters. Parameter modification can either be typed in or down loaded from a file. This facility allows the user, for example, to move pole and zero locations in a feedback system and observe the effect in real time.

When the designer has finished the optimization of his system, the development system produces a file which may be stored in an EPROM. Upon powering up of the SPROC, the EPROM is coupled to the host port of the SPROC, and the file contained in the EPROM is used to program the device.

Additional objects and advantages of the invention will become evident upon reference to the detailed description taken in conjunction with the provided figures.

DETAILED DESCRIPTION OF THE PREFERRED EMBODIMENTS

Figure 2:
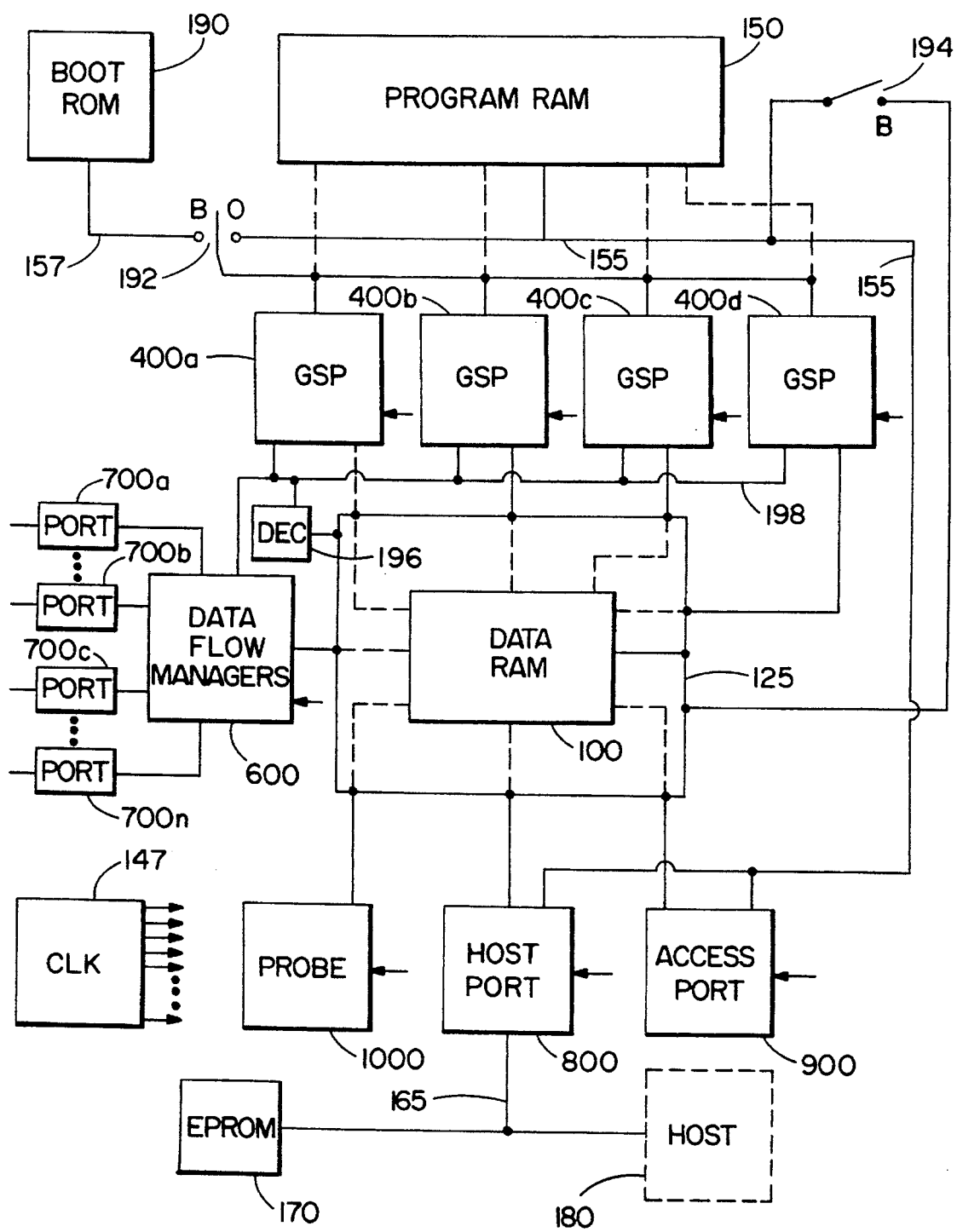
FIG. 2 is a high level block diagram of the SPROC device of the invention, and its connection to an external host or memory.

A high level block diagram of the preferred SPROC subsystem 10 of the invention is seen in FIG. 2. The preferred SPROC 10 preferably includes: a central "multi-ported" (as broadly understood) data RAM 100 accessed via data RAM bus 125; a multiported program RAM 150 accessed via program RAM bus 155; a plurality of internal processors (GSP) 400 coupled to the data RAM bus 125 and the program RAM bus 155 and which perform general processing functions; a data flow manager (DFM) 600 which is coupled to the data RAM bus 125 and which generally controls the flow of data into and out of the SPROC and relieves the GSPs from dealing with that data flow; a plurality of serial data ports 700 coupled to the DFM 600; a host port 800 coupled to both the data RAM bus 125 and the program RAM bus 155, the host port serving to couple the SPROC via the host bus 165 to either an EPROM 170 in stand-alone mode or to a host processor 180 in host mode; an access port 900 coupled to both the data RAM bus 125 and the program RAM bus 155; a probe 1000 coupled to the data RAM bus 125; and an internal boot ROM 190 with boot ROM bus 157 coupled via switch 192 to a GSP 400, the boot ROM 190 being used to control a master SPROC 10 in start-up mode, as well as to control the GSPs 400 of a SPROC 10 when the GSPs are in break mode; and a flag generating decoder 196 coupled via flag bus 198 to the DFM 600 and the GSPs 400 for flagging the DFM and GSPs when particular addresses of the data RAM 100 are being addressed (as determined by values on the data RAM bus 125).

The SPROC 10 of the invention can function in several different modes, some of which are determined by externally set pins (not shown). In particular, the SPROC 10 has a boot mode, an operational mode, and a development mode which includes a "break" mode. In addition, the SPROC may be a master SPROC or a slave SPROC which is either coupled to a master SPROC (see FIG. 11) or a host 180. In the boot mode (powering up), where the SPROC 10 is a master, the SPROC 10 is required to program both itself and any other slave SPROCs which might be part of the system. To do that, upon power up, switches 192 and 194 are toggled to connect to the B (boot) nodes. With switches 192 and 194 so set, the boot ROM is coupled to a GSP 400 such as GSP 400a, and the program RAM 150 is coupled to the data RAM bus 125. As boot ROM 190 is coupled to the GSP 400a, the GSP 400a is able to read the boot code in boot ROM 190. The code is arranged to cause the GSP to seize control of the host port 800 and to load information into the SPROC from EPROM 170 via the host port 800. The information contained in EPROM 170 includes the program code for the program RAM 150 (which is sent via data RAM bus 125), configuration information for the DFM 600 and the serial, host, and access ports 700, 800, 900, and parameter information including initialization information for the data RAM 100. This information, which was compiled by the development system of the invention (as discussed in more detail hereinafter) and stored in the EPROM, causes the SPROC to perform the desired functions on data typically received via serial ports 700.

In boot mode, after the master SPROC is programmed, the remaining (slave) SPROCs of the system (see FIG. 11) are programmed by having the master SPROC 10 read the EPROM 170 and forward the information via the common host bus 165 to the other SPROCs which reside in different address spaces. The slave SPROCs do not require a boot ROM for boot mode purposes, although the boot ROM 190 is also used to control the break mode operation of the SPROC (as described with reference to FIGS. 4).

After initialization is completed, boot mode is exited by the writing of a predetermined value (f0H) to a predetermined memory address (0401H) which causes switch 192 to toggle to node 0 (operation), and switch 194 to toggle to an open position. Then the SPROC is ready to operate for its intended signal processing purposes.

Although slave SPROCs may be programmed in boot mode by a master SPROC, a slave SPROC may also be programmed by a microprocessor host such as host 180 of FIG. 2. In slave mode where a host such as host 180 is coupled to the host bus 165, the internal boot ROM 190 is not active. In fact, switches 192 and 194 are set in the operating mode position. In order to program the SPROC, the host 180 preferably utilizes the host bus 165 and sends program data (possibly obtained from EPROM 170) via host port 800, and program RAM bus 155 to the program RAM, and data RAM data via host port 800 and the data RAM bus 125 to the data RAM. Configuration information for the serial ports 700 and data flow manager 600, is sent by the host 180 via host port 800 and the data RAM bus 125 as hereinafter described.

In operational mode, serial data flow into and out of the SPROC 10 is primarily through the serial ports 700, while parallel data flows through the host port 800. Serial data which is to be processed is sent into an input port 700 which is coupled to the data flow manager 600, which in turn forwards the data to appropriate locations (buffers) in the data RAM 100. In certain circumstances, described below, the DFM 600 will also write additional information to particular data RAM locations which are monitored by flag generating decoder 196. Decoder 196, in turn, causes the flags to be triggered over trigger or flag bus 198 as described below with reference to FIGS. 13. Other flags are triggered by pulsing hardware pins (not shown) via lines called "compute lines". The hardware pins are particularly useful in providing external timing information to the GSPs 400 and the DFM 600 of the SPROC.

Once the data has been sent to the data RAM 100, and typically after the GSPs 400 have been apprised via the flag bus 198 of the arrival of the information, the GSPs 400 can process the data. The processing of the data is conducted in accord with one or more programs stored in the multiported program RAM 150 which in turn represents the functions, topology, and parameters of a schematic diagram generated by the user of the development system. In processing the data, the GSPs 400 can read from and write to the data RAM 100. However, in order to shield the GSPs from I/O functions which would interrupt and burden the GSPs, the GSPs do not address each other directly, and do not read from or write to the DFM 600 or the input or output serial ports 700. Similarly, the GSPs do not have direct access to the host port 800 or the access port 900. Thus, in order for the processed data to be output from the SPROC 10, the processed data must be sent by the GSP 400 to the data RAM 100. The data in the data RAM is then either read by the DFM 600 and sent out serially via an output port 700, or is sent out over the host bus 165 in a parallel form via the host port 800.

The development mode of the SPROC device is used prior to the final programming of the EPROM 170 and is basically utilized in conjunction with a host 180. The development mode permits a user to easily and advantageously develop an integrated circuit signal processor by permitting the user access to the internals of the SPROC device. For example, if during a test operational mode it is desirable to obtain a data "dump" of the registers of the GSPs, the GSPs 400 can be put into break mode by causing a GSP to write to memory address 406H. As a result of writing to that address, a decoder (not shown) causes switch 192 to toggle, and instructions from the break section of the boot ROM 190 are used by the GSP 400 via bus 157. While boot ROM 190 is coupled to the GSP 400 in this manner, the GSP runs a routine which causes each register of the GSP to dump its contents to predetermined locations in the data RAM 100. That data may then be accessed by the user and changed if desired via the access port 900 or host port 800. Then, the break section of boot ROM 190 reloads the data into the GSP, writes to memory address 407H, and another decoder (not shown) causes switch 192 to toggle again such that the program RAM 150 is coupled to GSP 400, and the program continues.

Other tools useful in the development mode of the SPROC device are the access port 900 and the probe 1000. The access port permits the user to make changes to the program held in program RAM 150, and/or changes to parameters stored in the program RAM 150 or the data RAM 100 while the SPROC is operating. The probe 1000 permits the user to see internal signals generated by the SPROC in analog or digital form by monitoring the values of data written to any particular data RAM location. By using the access port 900 and the probe 1000 together, the effect of a change of a parameter value entered via the access port 900 may be immediately monitored by probe 1000.

Figures 1, 3:
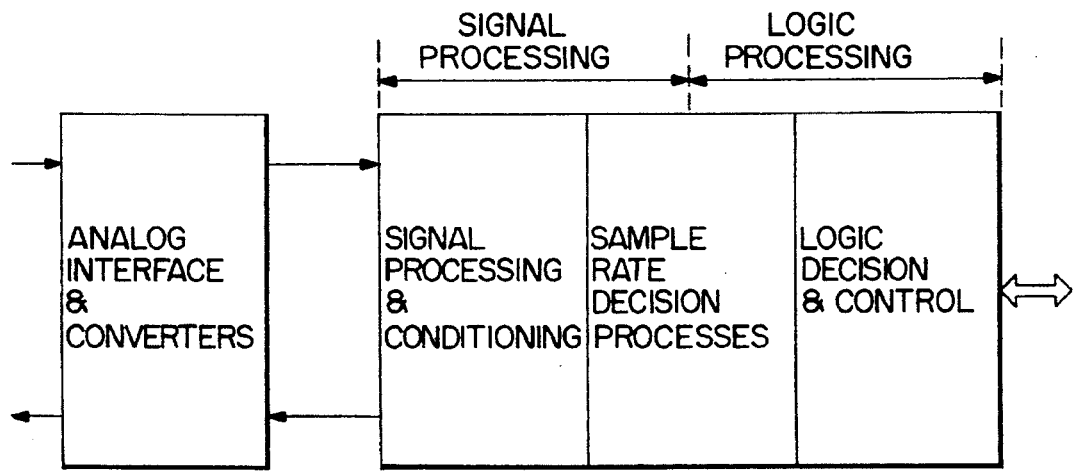
FIG. 1 is a diagram illustrating the segmentation of the tasks of a generic signal processing based product.
FIG. 3 is a timing diagram of the access of the various components and ports of the SPROC to the data RAM of the SPROC.

Before turning to the details of each of the blocks which comprise FIG. 2, it should be appreciated that central to functioning of the SPROC is a multiported data RAM 100 and a multiported program RAM 150. As aforementioned, the RAMs may either be multiported by time division multiplexing a single access to the RAMs (as seen by the solid lines of FIG. 2) or by providing true multiported RAMs (as suggested by the dashed lines of FIG. 2). As indicated in FIG. 3, in the preferred embodiment hereof, access to the program RAM 150 by the GSPs 400 and the host port 800 and access port 900 is via time division multiplexing of a single input. Similarly, access to the data RAM 100 by the GSPs 400, the DFM 600, the host port 800, the access port 900, and the probe 1000 is also via time division multiplexing of a single input.

As seen in FIG. 3, in the preferred embodiment of the invention, there are five principle time slots of the basic 50 MHz SPROC clock 147 (shown in FIG. 2): one for each GSP; and one shared by all of the other blocks of the SPROC. Each GSP 400 is able to read from the program RAM (p-rd) once over five clock cycles, effectively providing each GSP with a 10 MHz access to the program RAM 150. In the fifth clock cycle, the host is given preferred access to either read from or write to the program RAM. If the host does not need to read or write to the program RAM, the access port is given access. Alternatively, the host and access ports can be given 50/50 access to the fifth time slot by additional time division multiplexing.

In the boot mode, only one GSP of the SPROC (e.g. GSP 400a) accesses the boot ROM 190. Because boot mode is used to program the program RAM 150 with program data from EPROM 170, the program RAM bus 155 must be used by the GSP 400a for writing to the program RAM 150 (via data RAM bus 125 and switch 194). Thus, a program RAM write (p-wr) is provided as shown in FIG. 3 to allow for this situation (as previously discussed with reference to FIG. 2).

The data RAM 100 is similarly multiported via time division multiplexing. As indicated in FIG. 3, each GSP 400 is given a single time slot to either read or write from the data RAM 100. The fifth time slot (time slot 2) is subdivided in time as follows: 50% for the host interface; and the remaining fifty percent equally divided among the access port 900, each of eight sections of the DFM 600 relating to eight serial ports 700, and the probe 1000.

The RAMs 100 and 150 of the invention are preferably separate RAM devices and do not share memory space. For example, the program RAM 150 is preferably a 1K by 24 bit RAM which is assigned address locations 0000 to 03ff Hex. The data RAM 100, on the other hand is preferably a 3K by 24 bit data RAM with primary data RAM space of 2K assigned address 0800 to 0fff Hex, and auxiliary register based space of 1K assigned addresses 0400 to 07ff Hex. Of the primary data RAM addresses, addresses 0800 through 0813 Hex relate to the trigger bus flags as is discussed hereinafter, while addresses 0814 through 0fff are used as data buffers, scratch pad locations, etc. of the auxiliary space, certain addresses are used as follows:

| | |
|---|---|
| 0401H | Exit boot mode (write f0H) (generate GSP hard reset) |
| 0405H | Serial port reset (write) |
| 0406H | Global break entry (write) (generate GSP soft reset) |
| 0407H | Global break exit (write) (generate GSP soft reset) |
| 0408H | GSP1 break entry (write) (generate GSP soft reset) |
| 0409H | GSP2 break entry (write) (generate GSP soft reset) |
| 040aH | GSP3 break entry (write) (generate GSP soft reset) |
| 040bH | GSP4 break entry (write) (generate GSP soft reset) |
| 040cH | GSP1 break exit (write) (generate GSP soft reset) |
| 040dH | GSP2 break exit (write) (generate GSP soft reset) |
| 040eH | GSP3 break exit (write) (generate GSP soft reset) |
| 040fH | GSP4 break exit (write) (generate GSP soft reset) |
| 0410H | Serial Port 1 internal clock rate select |
| | (write 00 = CK/2048) (write 01 = CK/1024) |
| | (write 02 = CK/512) (write 03 = CK/256) |
| | (write 04 = CK/128) (write 05 = CK/64) |
| | (write 06 = CK/32) (write 07 = CK/16) |
| | where CK is the SPROC clock (50 MHz) |
| 0411H | Serial Port 2 internal clock rate select |
| 0412H | Serial Port 3 internal clock rate select |
| 0413H | Serial Port 4 internal clock rate select |
| 0414H | Serial Port 5 internal clock rate select |
| 0415H | Serial Port 6 internal clock rate select |
| 0416H | Serial Port 7 internal clock rate select |
| 0417H | Serial Port 8 internal clock rate select |
| 0440H to 0447H | Serial Port 1 (pradd = 0800H) |
| 0448H to 044fH | Serial Port 2 (pradd = 0801H) |
| 0450H to 0457H | Serial Port 3 (pradd = 0802H) |
| 0458H to 045fH | Serial Port 4 (pradd = 0803H) |
| 0460H to 0467H | Serial Port 5 (pradd = 0804H) |
| 0468H to 046fH | Serial Port 6 (pradd = 0805H) |
| 0470H to 0477H | Serial Port 7 (pradd = 0806H) |
| 0478H to 047fH | Serial Port 8 (pradd = 0807H) |
| 0480H to 0487H | DAC (probe) input port (pradd = 0808H) |
| 0488H to 048fH | DAC (probe) serial output port |
| 04fcH to 04ffH | Host interface registers |

Memory locations 1000 to ffff Hex refers to external address space (e.g. slave SPROCs, other devices, or memory).

Of the auxiliary memory locations in the data RAM 100, it should be noted that each GSP is given a break entry and break exit data address. While the embodiment of FIG. 2 causes bus 155 to be connected to the boot/break ROM 190 when a break is implemented such that all GSPs must break together, different circuitry would allow for individual GSP breaks.

The eight twenty-four bit locations provided for each serial port are used to configure the serial ports as well as the DFM section associated with each serial port as hereinafter described. Similarly, the eight words of memory assigned the input and output ports of the probe are used to configure the probe, while the eight words of memory assigned the host port are used to configure the host port as described hereinafter.

Figure 13A:
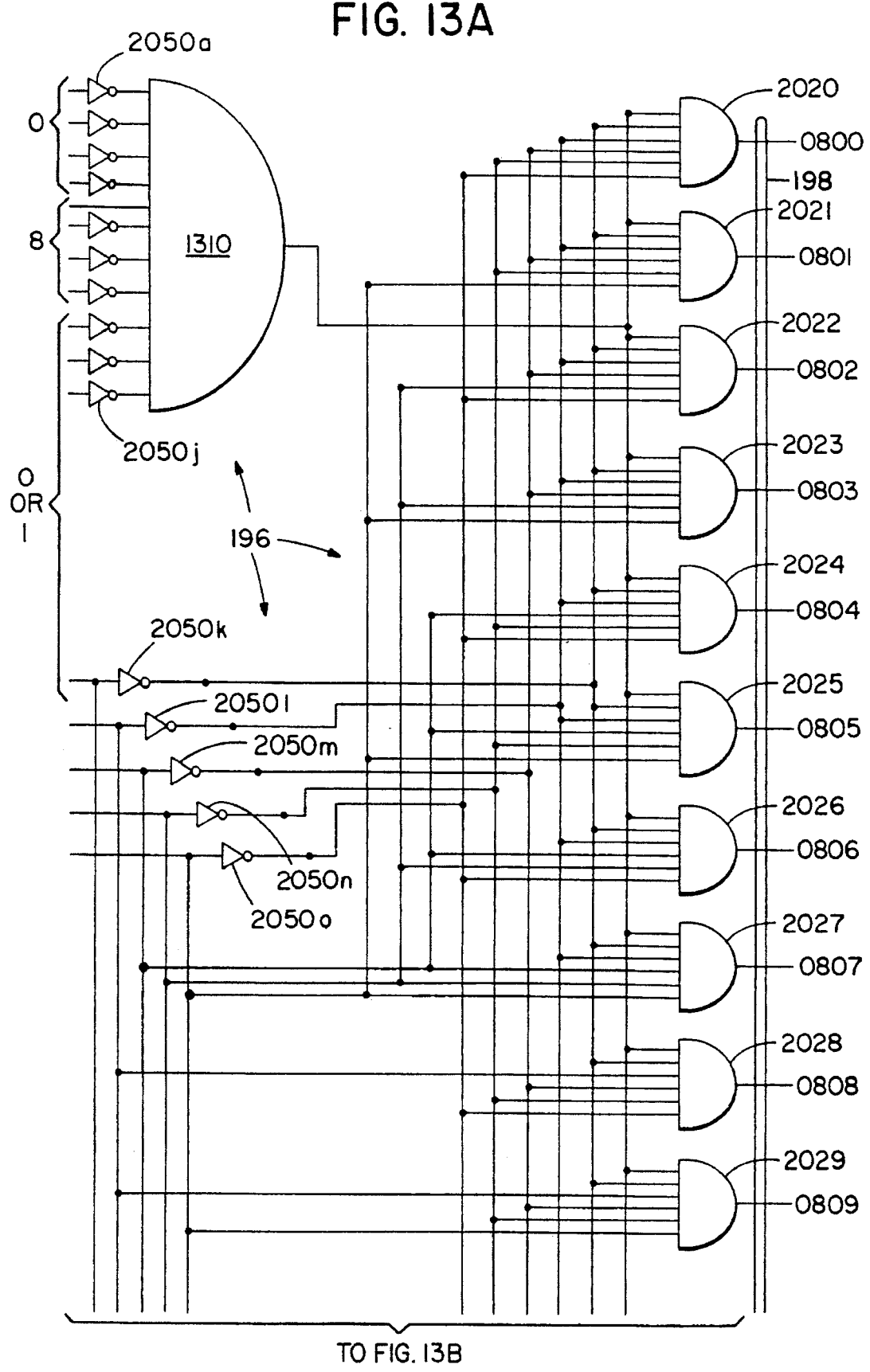
FIG. 13 is a block diagram of a decoder utilized in a flagging scheme of the invention.

Further, with regard to the memory locations, it is noted that when information is written to any of the serial port locations indicated, another address (pradd), which turns out to be a trigger flag address is generated by the DFM 600 (as discussed in more detail hereinafter) and written to the data RAM bus 125. The writing of particular addresses to the data RAM bus 125 is monitored by decoder 196. As seen in FIG. 13, the decoder 196 is logically comprised of an eleven input AND gate 1210, sixteen six input AND gates 2020–2036, and fifteen inverters 2050a–2050o. In essence, the first four bits of the twenty-four bit data address written to data RAM bus 125 are inverted by inverters 2050a–2050d to select for hexadecimal "0". The fifth bit of the address is passed directly to AND gate 1210, while the sixth through eighth bits are inverted by inverters 2050e–2050g; the fifth through eighth bits for selecting the hex address "8". The ninth through eleventh bits are inverted by inverters 2050h–2050j to select in conjunction with a twelfth bit a hexadecimal "0" or "1", and the last five bits (the twelfth through sixteenth bits) are inverted by inverters 2050k–2050o, and the uninverted and inverted states of the last five bits are provided in different combinations, along with the output of AND gate 2010, to the six input AND gates to provide an appropriate positive output on trigger bus 198 should any of addresses 0800–0813 be placed on the data bus 125 (i.e. received by the decoder 196).

Figure 4A:
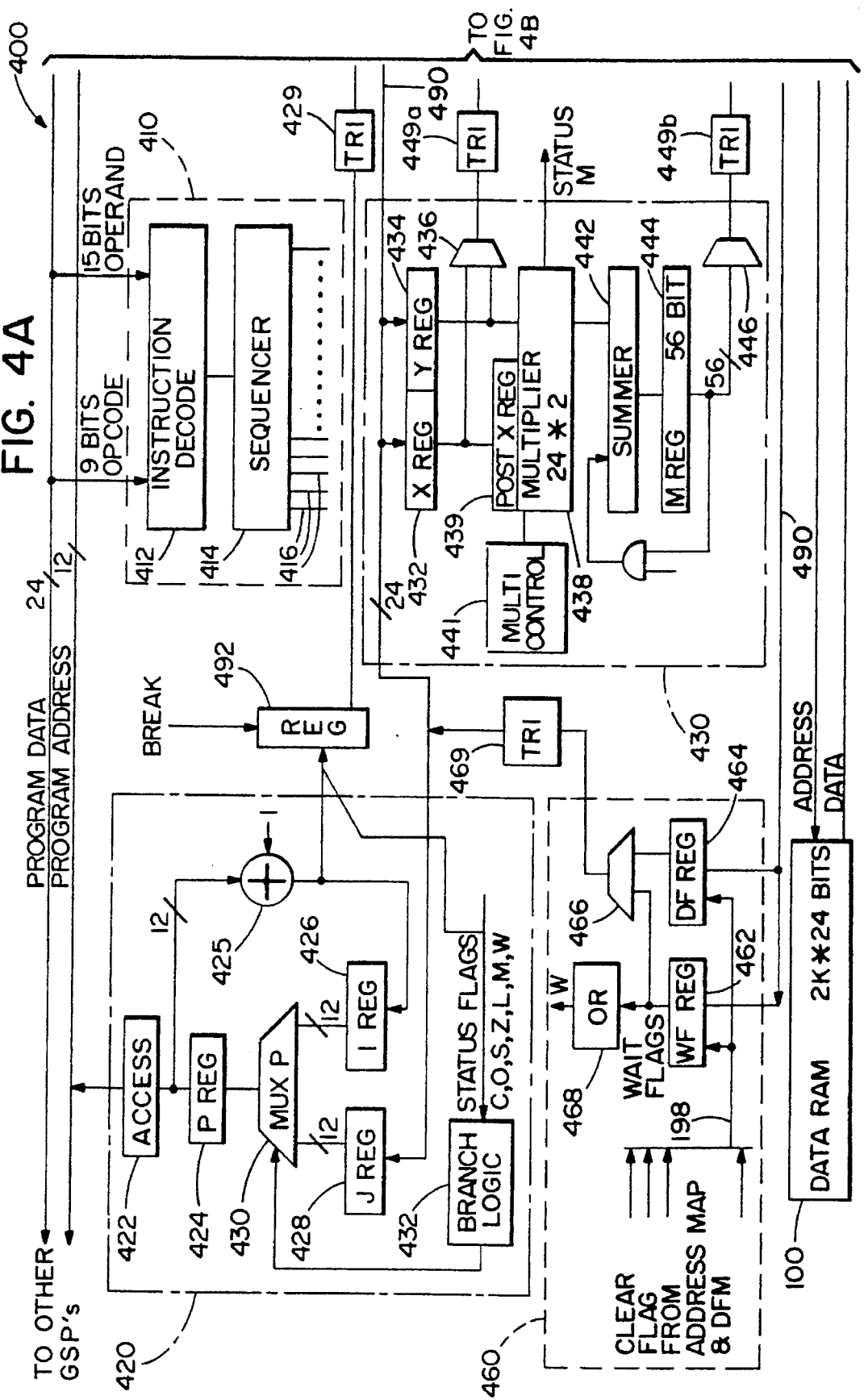
FIG. 4 is a block diagram of the internal processors of the SPROC device of the invention.
Figure 4B:
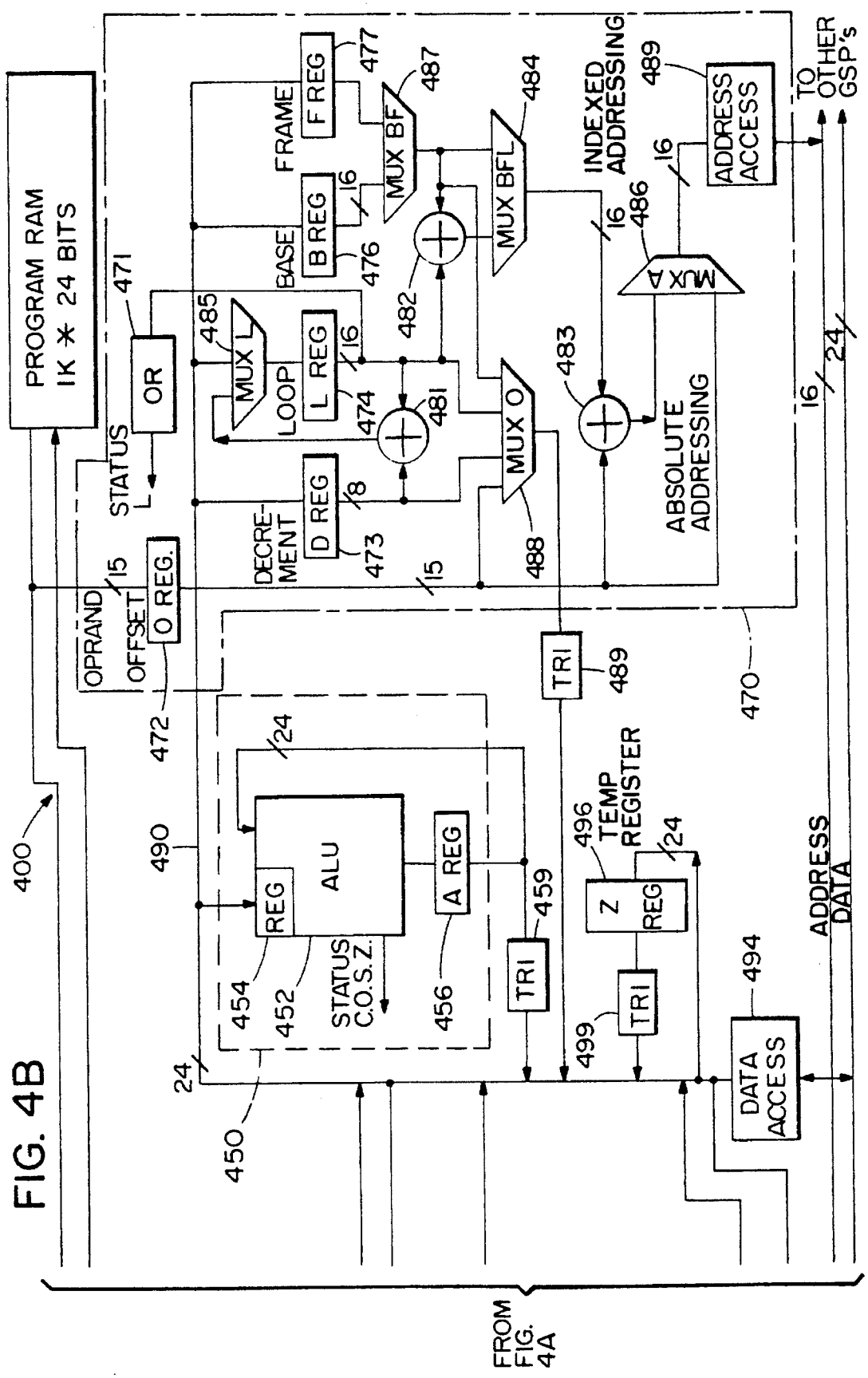

Turning to FIG. 4, a block diagram of the preferred general signal processor (GSP) 400 of the invention is seen. The GSP is coupled to a program RAM 150 via program RAM bus 155. Because the program RAM 150 is preferably shared by a plurality of GSPs 400, access to the program RAM bus is time division multiplexed as indicated in FIG. 3. The program RAM bus 155 is comprised of a data bus of width twenty-four bits, and an address bus of ten bit width where a, 1K program RAM is utilized. Of course, if a larger program RAM is desired, additional bits are required to address the same, and the program RAM bus would be wider. As indicated in FIG. 4, the GSP 400 writes to the address section of the program RAM bus to indicate which instruction (RAM location) is desired. However, under ordinary operating conditions the GSP 400 is not capable of writing data to the program RAM 150. Under ordinary operating conditions, data is written into the program RAM 150 only via the host or access ports shown in FIG. 2 which are also coupled to the program RAM bus 155 in a time division multiplexed manner.

The GSP 400 is also coupled to the multiported data RAM 100 via a data RAM bus 125. Because the data RAM 100 is central to the processor architecture, and because non-arbitrated access to the data RAM 100 is desired, the data RAM 100 must either be a true multiported data RAM, or access to the data RAM 100 via the data RAM bus 125 must be time division multiplexed so as to effectively create a multiported RAM. The data RAM bus preferably comprises a data RAM address bus of sixteen bit width, an a data RAM data bus of twenty-four bit width. As indicated in FIGS. 3 and 4, the GSP may write to the address section of the program RAM 100. Also, the GSP may both read and write to the data section of the data RAM bus.

The GSP is substantially described by the details and functioning of six sections: a block controller 410; a program control logic block 420; a multiplier block 430; an ALU block 450; a flag block 460; and a data RAM address generator block 470. Coupling all six sections, as well as a break register 492, a data access register 494, and a temporary register 496 is an internal twenty-four bit bus 490. All access from any of the sections or from the registers 492, 494, or 496 onto the internal bus 490 is via tristate drivers 429, 449a, 449b, 459, 469, 489, and 499.

Block controller 410 is comprised of instruction decoder 412, and sequencer 414. The instruction decoder 412, when enabled, takes fourteen bits (nine bits of opcode, and five bits of operand) off of the data portion of the program RAM bus. Six of the nine opcode bits are used to indicate the operation (instruction) which the GSP is to perform (e.g. add, shift, jump, etc.), with up to sixty-four instructions being accommodated. A chart of instructions and descriptions thereof is appended hereto as pages A-7 through A-9 of Appendix A entitled "GSP ASSEMBLY LANGUAGE USER'S GUIDE" which also includes additional information for understanding the manner in which the GSP is instructed. While numerous mathematical and logical instructions are provided, it will be appreciated that additional instructions could be accommodated by increasing the number of opcode bits. In the preferred embodiment an additional-three bits of opcode are utilized to specify the addressing mode the GSP is to use. In particular, in the "absolute" mode (code 000), the fifteen bits in the O register 472 of the address generator block 470 are used to select an address in the data RAM 100, and the data in that address of data RAM is used for the operation. In the "register" mode (code 001), the five operand bits obtained by the instruction decoder 412 are used to specify which register of the numerous registers of the GSP is to place its contents onto the internal bus 490. In the "immediate left" mode (code 010), the fifteen bits of data in the O register are to be put into the fifteen msb slots of the internal bus 490, while in the "immediate right" mode (code 011), the fifteen bits are put into the fifteen lsb slots of the internal bus. In the remaining four modes, "BL indexed" (code 100), "B indexed" (code 101), "FL indexed" (code 110), and "F indexed" (code 111), as described in more detail hereinafter, values in base registers B or F are added to the value of the fifteen bit operand stored in the O register and, where appropriate, to the value in the L (loop) register, and are output onto the data RAM bus 125.

Instruction decoder 412 is not only coupled to the program RAM bus, but to the numerous multiplexers, tristate drivers, registers, etc. of the GSP via lines 416. Based on the instruction which is decoded by instruction decoder 412, various of those lines 416 are enabled in a sequence as determined by the sequencer 414. In effect, instruction decoder 412, and sequencer 414 are simply look-up charts, with instruction decoder 412 looking up which lines 416 must be enabled based on the code found in the nine bits of opcode, and sequencer 414 looking up the sequence to which the enabled lines must subscribe.

While instruction decoder 412 decodes whatever instruction is on the program RAM bus 155 when the GSP 400 is granted access to that bus, the instruction which is on the bus is generated and dictated by the program logic block 420. Program control logic block 420 is comprised of a tristate driver 422, a program address value register 424 (also called the "P" register), an incrementer 425, an increment (I) register 426, a jump (J) register 428, a multiplexer 430, and a branch logic block 432. The P register 424 contains the location of the program RAM 150 which contains the microinstructions which are to be used by the GSP 400. P register 424 writes that address onto the program RAM bus 155 by sending it to tristate driver 422 which acts as the bus interface.

Updating of the P register 424 is accomplished via muxP 430 which chooses one of the twelve bit addresses stored in the I register 426 or the J register 428 based on information from branch logic block 432. The address stored in the I register is simply the next numerical address after the address stored in the P register, as a value of one is added at incrementer 425 to the value stored in P register 424. In most situations, muxP 430 will permit the P register 424 to be updated by the I register, and the sequential addressing of the program RAM will continue. However, in some situations, such as where a jump in the routine is desired, the multiplexer 430 will permit the address in the J register 428 to be loaded into the P register 424. The decision to jump is made by the branch logic block 432 which reads the status of a plurality of status flags as is hereinafter discussed. The address to which the jump is made is obtained by the J reg 428 from the internal bus 490, which may obtain the address from any of the sections of the GSP 400 (or from the data RAM 100)

Coupled to the program control logic block 420 is a break register 492 in which upon the execution of a break instruction is loaded status flag information as well as the value of the P register plus one. The status flag and P register information is stored in the break register 492 which is coupled to internal bus 490 via tristate driver 429 because it is otherwise not available for placement on to the internal bus 490. A program break is typically executed when an information dump is desired by the system user, and is accomplished by putting an instruction in the program RAM 150 which causes the GSP 400 to write to a certain address (e.g. 0406H) of the data RAM 100. A decoder (not shown) on the data RAM bus 125 is used to determine that the program break is to be executed (based on the location to be written to), and a control signal is provided by the decoder to the break register 492. The program break instruction in the program RAM 150 causes instructions in a boot/break ROM 190 (shown in FIG. 2) which is coupled to the program RAM bus 155 to be accessed by the program control logic block 420. The instruction code in the boot/break ROM 190 in turn causes the values of each of the registers in the GSP 400 to be written into desired locations in the data RAM 100. Then the GSP 400 is kept waiting until the wait flag stored in its wait flag register (discussed below) is cleared. During the wait period, if desired, the user can change the values of data in the data RAM as described in more detail below with reference to the access port 900. Then, when the wait cycle is terminated, the instructions in the boot/break ROM 190 causes the values in the data RAM, including any new values, to be written back to their appropriate registers in the GSP. The location of the next desired microinstruction contained in a program RAM 150 location is loaded into the P register, so that the GSP can continue in its normal fashion.

The multiplier block 430 and the ALU block 450 of the GSP perform the numerical computations for the GSP. The multiplier block 430 is comprised of two input registers Xreg 432 and Yreg 434, a multiplexer 436 which is coupled to the internal bus 490 via tristate driver 449a, a multiplier 438 with a post Xreg 439, and a multiplier control 441, a summer 442, an output register Mreg 444, and a second multiplexer 446 which selects which of six words is to be output onto internal bus 490 via tristate driver 449b. Typically, the multiplicand is loaded into Xreg 432. Then the multiplier is loaded into Yreg 434 while the multiplicand is loaded into post Xreg 439. The multiplier control 441 permits the multiplier 438 to function over several machine clock cycles (e.g. three clock cycles totalling 300 nanoseconds=fifteen internal GSP cycles). If in multiplying, the multiplier overflows, a status flag M is set, and this information is conveyed to the branch logic block 432 of the program logic section 420. Regardless, the product of the multiplier and multiplicand is forwarded to summer 442 which, in a multiply with accumulate mode, adds the new product to the sum of previous products and forwards the sum to the multiply register M 444. In a pure multiply mode, the contents of the summer are cleared so that the product is forwarded through the summer which adds zero and send the product to the M register.

The contents of the M register 444 are available to the internal bus 490. However, because the M register can accommodate a fifty-six bit word, and the internal bus 490 is a twenty-four bit bus, only a portion of the M register word may be placed on the bus at one time. Thus, multiplexer 446 is provided to either select the twenty-four least significant bits (lsb's) in the M register, the twenty-four next lsb's in the M register, or the eight most significant bits (msb's) in the M register. If the eight msb's are chosen, the eight msb's are placed in the eight lsb slots of the internal bus 490, and the msb of the eight bits is extended through to the msb slot on the bus (e.g. if the msb is a "1", the first seventeen msb's on the bus will be "1"). The multiplexer 446 is also capable of selecting a left shifted by two (zero filling the right) twenty-four or eight bit word. Thus, in all, multiplexer 446 can provide six different outputs based on the product in the M register 444.

The ALU block 450 of the processor is basically a standard ALU, having an arithmetic-logic unit 452 with input register 454, and an output accumulator register 456. The arithmetic-logic unit 452 is capable of the standard functions of similar units, such as adding, subtracting, etc., and produces values for Areg 456, as well as status flags including carry (C), overflow (O), sign bit (S), and zero (Z). The status flags are used by the branch logic block 432 of the program logic block 420 to determine whether a conditional jump in the microcode program should be executed. The Areg contents are output onto internal bus 490 via tristate driver 459.

Wait flag block 460 is comprised of two wait flag registers WFreg 462 and DFreg 464, a multiplexer 466, and OR gate 468. The bits of the wait flag registers may be set (i.e. written to) by data sent over the internal bus 490. Also, registers WFreg 462 and DFreg 464 are coupled to a flag bus 198 which is written to each time predetermined locations in the data RAM 125 are addressed as hereinbefore described with reference to FIGS. 2 and 13. In this manner, each bit of the wait flag registers 462 and 464 may be selectively cleared. When all of the bits in register WFreg 462 have been cleared due to the occurrences of specified events (e.g. the data RAM has received all the information which is required for another computation), OR gate 468 is used to provide a status flag W which indicates the same. Status flag W is read by the branch logic block 432. In this manner, "jump on wait flag" commands may be executed.

The DFreg 464 of the wait flag block 460 functions similarly to the the WFreg 462, except that no signals indicating the presence of all zeros (or ones) are output by the DFreg. In order to check the contents of the DFreg (or the WFreg, if all values in the WFreg are not zero), the register must be selected to put its contents on the internal bus 490. The selection of one of the registers is made by the instruction decode 412 and sequencer. 414, and the contents are forwarded via multiplexer 466 and the tristate driver 469. An easy manner of determining whether the DFreg 464 has all zeros is to forward the contents of the DFreg 464 to the ALU 452, which will provide a status flag Z if the contents are zero.

The final large block of the general signal processor is the data RAM address generator block 470 which includes bus wide OR gate 471, registers Oreg 472, Dreg 473, Lreg 474, Breg 476, Freg 477, adders 481, 482, and 483, multiplexers muxBFL 484, muxL 485, muxA 486, muxBF 487, muxO 488, and an address access block 489. As previously indicated, the Oreg 472 obtains the fifteen least significant bits of the instruction on the program RAM bus. If "absolute" addressing is desired, i.e. the address to be written onto the data RAM bus is included in the program RAM microinstruction itself, the address is written into the Oreg 472, and then forwarded to the data RAM bus (a sixteenth bit having been added by a zero extender, not shown) via muxA 486 and the address access block 489. The sixteen bit address is then placed on the data RAM bus at the appropriate time. All other situations constitute "indexed" addressing, where the address to be put out on the data RAM bus is generated internally by the data RAM address generator block 470.

Addresses are generated by adding the values in the various registers. In particular, and as indicated in FIG. 4, the Oreg 472 is the offset register, the Dreg 473 is a decrement register, the Lreg 474 is a loop register which sets the length of a loop, the Breg 476 is a base address register, and the Freg 477 is a frame address register which acts as a second base address register. The O register obtains its data off of the program RAM bus, while registers D, L, B and F obtain their data from the internal bus 490. If it is desired to add some offset value to the value in the base or frame register (i.e. the "B indexed mode" or "F indexed mode") in order to generate an address, muxBF 487 selects appropriately the Breg 476 or the Freg 477, muxBFL 484 selects the value coming from muxBF 487, and the Breg or Freg value is added to the offset value of the Oreg by the adder 483. That value is then selected by muxA 486 for output over the data RAM bus via the address access block 489. Similarly, if it is desired to add some offset value and some loop value to the value in the base or frame register (i.e. the "BL indexed mode" or the "FL indexed mode"), the value in the L register is added to the value in the B or F registers at adder 482, and the sum is passed via muxBFL 484 to adder 483 which adds the value to the value in the O register.

By providing adder 481, and by coupling the decrement register Dreg and the loop register Lreg to the adder 481, registers an address loop is effectuated. In particular, the Lreg sets the length of the loop, while the Dreg sets the value by which the loop is decremented. Each time the Dreg is subtracted from the Lreg 475 at adder 481, the new value is fed back into the Lreg 475 via muxL 485. Thus, each time a DJNE instruction is executed (as discussed below), the resulting value in the Lreg is decreased by the value of the Dreg. If added to the Breg or Freg, by adder 482, the address generated is a sequentially decrementing address where the value in the Dreg is positive, and a sequentially incrementing address where the value in the Dreg is negative.

The ability to loop is utilized not only to provide a decrementing (or incrementing) address for the data RAM bus, but is also utilized to effect changes in the program RAM address generation by providing a "decrement and jump on not equal" (DJNE) ability. The output from the adder 481 is read by OR gate 471 which provides a status flag L (loop) to branch logic block 432. The status flag L maintains its value until the L register has looped around enough times to be decremented to the value zero. Before that point, when the Lreg is not zero, the next instruction of the GSP is dictated by the instruction indicated by the Jreg 428. In other words, the program jumps to the location of the Jreg instruction instead of continuing with the next instruction located in the I register. However, when the Lreg does Coupled to the internal bus 490, and interfacing the internal bus 490 with the data slots on the data RAM bus is the data access port 494. The data access port 494 is capable of reading data from and writing data to the data RAM and is given access to the data RAM in a time division multiplexed manner as previously described. In writing to the data RAM, the data access port 494 and the address access port 489 are activated simultaneously. In reading data from the RAM, the address access port 489 first places on the data RAM bus the data RAM address in which the desired data is stored. The data is then placed on the data RAM bus by the data RAM, and the data access port 494 which is essentially a dual tri-state driver, receives the data and passes it onto the internal bus 490 for storage in the desired GSP register.

If desired, additional registers such as Z register 496 may also be coupled to the internal bus 490, and may be used as temporary storage. The contents of Zreg 496 are output onto the internal bus 490 via tristate driver 499.

The functioning of the GSP is well described by the following microcode example which is provided for purposes of description only:

| INST # | HEXCODE | LABEL $START | ASSEMBLY CODE | COMMENTS |
| --- | --- | --- | --- | --- |
| 0000 | 498008 | | LDWS #8 | initialize wait reg. |
| 0001 | f98001 | $WAIT | JWF $WAIT | wait until RAM address 803H is written to |
| 0002 | 3d8001 | | LDD #1 | set Dreg (decrement) to 1 |
| 0003 | 458007 | | LDL #7 | set Lreg (loop) to 7 |
| 0004 | 358824 | | LDB #824H | set Breg (base) to HEX 824 |
| 0005 | 318000 | | LDA #0 | initialize ALU accumulator |
| | | $LOOP | | |
| 0006 | 120000 | | ADD [B + L] | add the 8 numbers in RAM |
| 0007 | fd8006 | | DJNE $LOOP | locations HEX 82b . . . 824 |
| 0008 | f1800b | | JGE $POS | test accumulator and if positive |
| 0009 | 240000 | | NOT | else take 1's complement of accumulator |
| 000a | 118001 | | ADD #1 | add 1 to 1's complement |
| | | $POS | | |
| 000b | 4c800e | | LDX A | load accum. into Xreg |
| 000c | 5d2666 | | MPY #1.2 | multiply Xreg by 1.2 |
| 000d | 740000 | | NOP | no operation permits |
| 000e | 740000 | | NOP | multiplier to complete |
| 000f | d98012 | | JMF $ERROR | test overflow flag M and jump if error |
| 0010 | a40823 | | STMH 823H | store result in RAM location 823H |
| 0011 | c58000 | | JMP $START | return to $START |
| 0012 | 318000 | $ERROR | LDA #0 | on error, store 0 in |
| 0013 | 900823 | | STA 823H | location 823H |
| 0014 | c58000 | | JMP $START | return to $START |
| | | END | | | decrement to the value zero, the OR gate 471 goes low and toggles flag L. On the next DJNE instruction, since the "not equal" state does not exist (i.e. the Lreg is zero), branch logic 432 causes muxP 430 of the program logic block 420 to return to obtaining values from the Ireg 426 instead of from the Jreg 428, and the program continues.

The values of any of the O, D, L, B, or F registers may be placed on the internal bus 490, by having muxO 488 (and where appropriate mux BF 487) select the appropriate register and forward its contents via tristate driver 489 to the internal bus.

The first instruction (0000) causes the wait register to be loaded with the value eight. Instruction 0001 causes the GSP to wait until the trigger flag address of 803H is written to by another GSP or by other circuitry of the system. Instruction 0001 accomplishes the wait by telling the GSP to jump to instruction 0001 (i.e. repeat itself) until the wait flag (i.e. controlled by writing to address 803H) is toggled. Once the wait flag is toggled, instructions 0002–0004 set the D, L and B registers of the data RAM address generator block 470. By setting the loop register to a value 7, and the D register to value 1, the loop will executed eight times.

Instructions 0006 and 0007 comprise the loop. Instruction 0006 requires that the value in the base and loop registers be added together by adder 482, added to a zero value contained in the Oreg 472, and placed onto the data RAM bus. The value at data RAM location B+L is then placed onto the data RAM bus, forwarded through data access block 494 into the ALU 452, and accumulated in the A register 456. The DJNE assembly code command of instruction 0007 looks to see whether the L flag has been toggled. If not, the L register is decremented by the value in the D register, and the program jumps back to $LOOP; i.e. instruction 0006 which adds the new value of L to the value in the B register and places that onto the data RAM bus. The value at that data RAM location is then placed onto the data RAM bus, forwarded through the data access block 494, added in the ALU with the value in the A register 456, and stored as an accumulated value in the A register 456. This procedure continues until n is equal to zero and the L flag is toggled. Then upon reaching instruction 0007, no decrement or jump is executed. Rather, the program continues to instruction 0008.

At instruction 0008 the value in the Areg 456 is tested by looking at the status flags of the ALU 452. If the value is positive, the program jumps to instruction 000b (whose address was placed in the Jreg 428). If not, instructions 0009 and 000a are carried out. At 0009, the one's complement of the accumulator is taken by the ALU 452, and at step 000a, the value one is added. In this manner a two's complement of the value in the accumulator is provided.

At instruction 000b, the positive value of the accumulator, or the two's complement generated is loaded from the Areg 456 into the Xreg 432 of the multiplier block 430. Instruction 000c causes the value in the Xreg 432 to be multiplied by the value 1.2. Because a multiplication function requires numerous steps and several cycles, instructions 000d and 000e are NOP (no operation) instructions, which permits the multiplier of the GSP to complete the calculation before continuing the program. However, if it was desired to conduct an arithmetic or logic calculation in the ALU section 450, or to write a value to or fetch a value from the data RAM, the GSP could conduct concurrent operations, provided the multiplier section 430 was not involved.

Instruction 000f tests the multiplier overflow flag M. If the multiplier overflowed due to the multiplication, an error is flagged and the program jumps to instruction 0012. If there is an error, instruction 0012 loads the value zero into the A register 456 of the ALU block 450. Then, at instruction 0013, the value of the A register is written to location 823H of the data RAM. The entire program is restarted by instruction 0014 which jumps back to instruction 0000 which places the GSP into the wait state. If there is no error indicated by flag M, instead of jumping to instruction 0012, the program continues with instruction 0010. Instruction 0010 causes the value in the Mreg 444 to be stored at RAM location 823H by having the value written to the internal bus 490 and then out onto the data RAM bus via data access port 494. Instruction 0011 then causes a jump back to the start of the program (instruction 0000) which places the GSP in the wait state.

Figure 5:
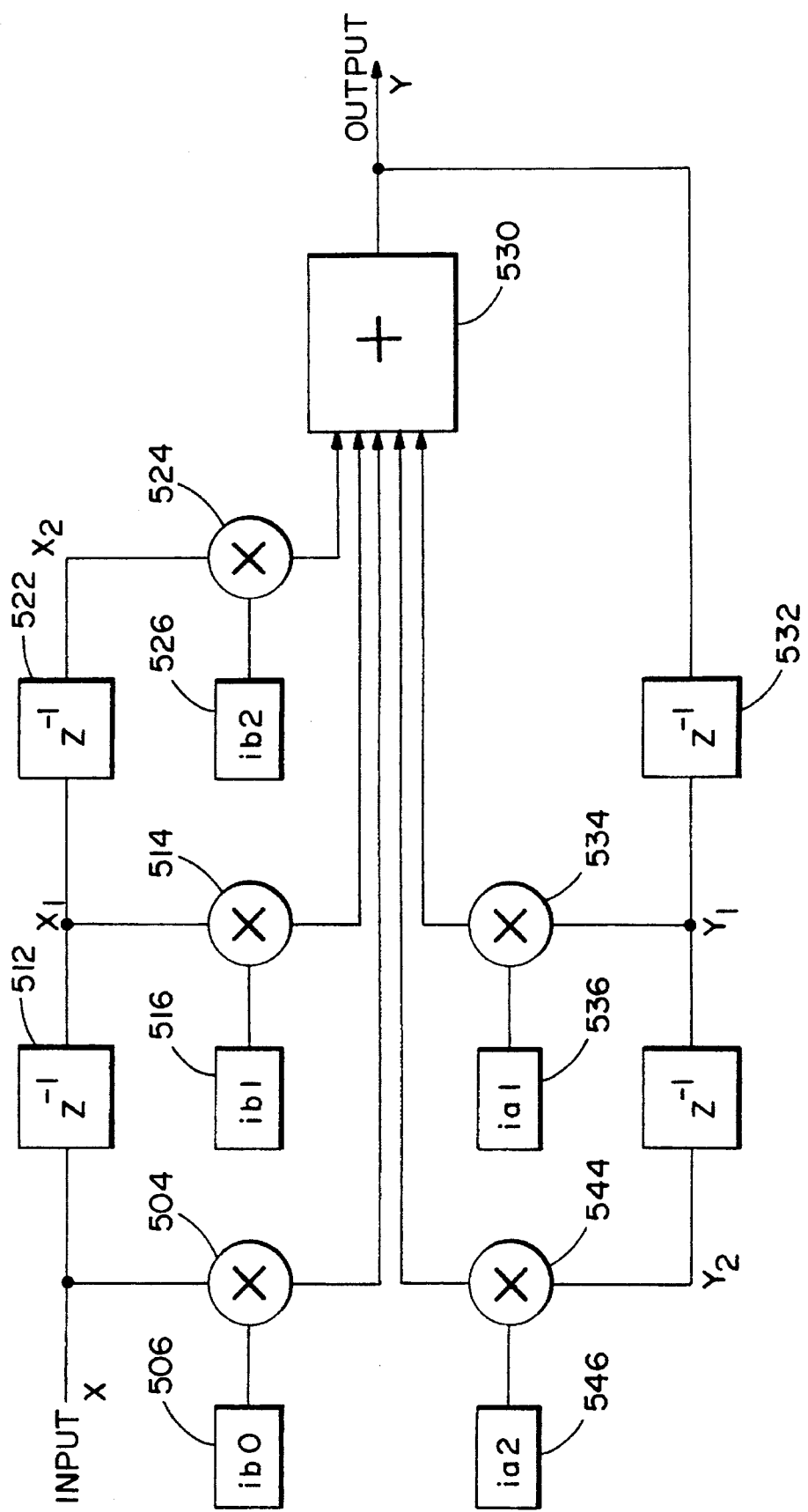
FIG. 5 is a block diagram of a digital biquad filter.

Additional understanding of the GSP may be had by reviewing the assembly code and operands of a sample function accomplished by the GSP (a library of instruction sets for all functions attached hereto as Appendix B). In particular, the following eighteen cycle instruction set comprises a listing for biquad filter having the structure seen in FIG. 5. In FIG. 5, an input value x is multiplied by multiplier 504 by parameter value ib0 stored in block 506. The previous x value delayed by delay block 512 is shown as x1 and is multiplied at multiplier 514 by parameter value ib1 taken from block 516. The x value previous to the x1 value which was further delayed by delay block 522 is shown as x2 and is multiplied at multiplier 524 by parameter value lb2 taken from block 526. The products of ib0 times x, ib1 times x1, and ib2 times x2 are summed by summation block 530 along with additional values generated from the output of summation block 530. Thus, the previous output y delayed by delay block 532 and is shown as y1. The y1 value is multiplied at multiplier 534 by parameter value ia1 from block 536 and added by summation block 530 to value ia1. Similarly, the output previous to y1 which was further delayed by delay block 542 is shown as y2. The y2 value is multiplied at multiplier 544 by parameter value ia2 taken from block 546 and is further added to the other products.

The block diagram of the biquad which includes parameter values ib0, ib1, ib2, ia1 and ia2, and changing variables x1, x2, y1, and y2 may be implemented by the GSP as the following:

| LINE # | ASSEMBLY CODE | COMMENTS |
| --- | --- | --- |
| 1 | LDX x2 | Load X reg with sample x2 |
| 2 | MPY ib2 | Multiply x2 times ib2 |
| 3 | NOP | No operation |
| 4 | LDX x1 | Load X reg with sample x1 while multiply continues |
| 5 | MAC ib1 | Multiply x1 times ib1 and accumulate with x2 times ib2 |
| 6 | STX x2 | Store the value in the X reg (x1) into location x2 for next computation |
| 7 | LDX [in] | Load the X reg with data at addr. [in] while previous multiply continues |
| 8 | MAC ib0 | Multiply [in] value times ib0 and accumulate with other values |
| 9 | STX x1 | Store the value in the X reg ([in]) in location x1 for next computation |
| 10 | LDX y2 | Load X reg with sample y2 |
| 11 | MAC ia2 | Multiply y2 times ia2 and accumulate with other values |
| 12 | NOP | No operation while waiting for multiply |

-continued

| LINE # | ASSEMBLY CODE | COMMENTS |
|---|---|---|
| 13 | LDX y1 | Load X reg with y1 while multiply continues |
| 14 | MAC ia1 | Multiply y1 times ia1 and accumulate with other values |
| 15 | STX y2 | Store the value in the X reg (y1) in location y2 for next computation |
| 16 | NOP | No operation while waiting for multiply |
| 17 | STMH y1 | Store the high section of the Mreg accumulated value at location y1 for next computation |
| 18 | STMH [out] | Store the high section of the Mreg accumulated value at the output locale |

Lines 1–3 of the code cause the multiplier of the GSP to multiply the x2 value (i.e. the value stored in location x2) by parameter value ib2. Lines 4 and 5 of the code cause the multiplier to multiply the x1 value (i.e. the value stored in location x1) by parameter value ib1 and to add the product to the product of x2 and ib2. Line 6 of the code moves the x1 value into the x2 location so that the next time the code is executed (e.g. when a new x value is received) the x1 sample will become the x2 sample (i.e. delayed by one total cycle). Lines 7 and 8 of the code cause the multiplier to multiply the new x value (xin) by ib0 and to add the product to the previously accumulated products. Line 9 of the code parallels line 6 of the code by moving the present input value (xin) into the x1 location so that the next time the code is executed the new x value becomes the delayed x1 value.

Lines 10–12 of the biquad code cause the multiplier of the GSP to multiply the twice delayed output value y2 by parameter value ia2 and to add that product to the previously accumulated products, while lines 13 and 14 cause the multiplier to multiply the one delayed output value y1 by parameter value ia1 and add that to the previously accumulated products. Line 15 causes the GSP to store the y1 parameter value into location y2 for the next time the code is executed, while line 16 conducts no operation, thereby permitting the multiplication of y1 and ia1 and the adding of its product to the accumulated products to complete. Line 17 causes the sum in the accumulator (ib0 times x, plus ib1 times x1, plus ib2 times x2, plus ia1 times y1, plus ia2 times y2) to be stored in the y1 location for the next execution of the code, while line 18 takes the same sum and puts it in an output location as the output of the biquad.

Figure 6A:
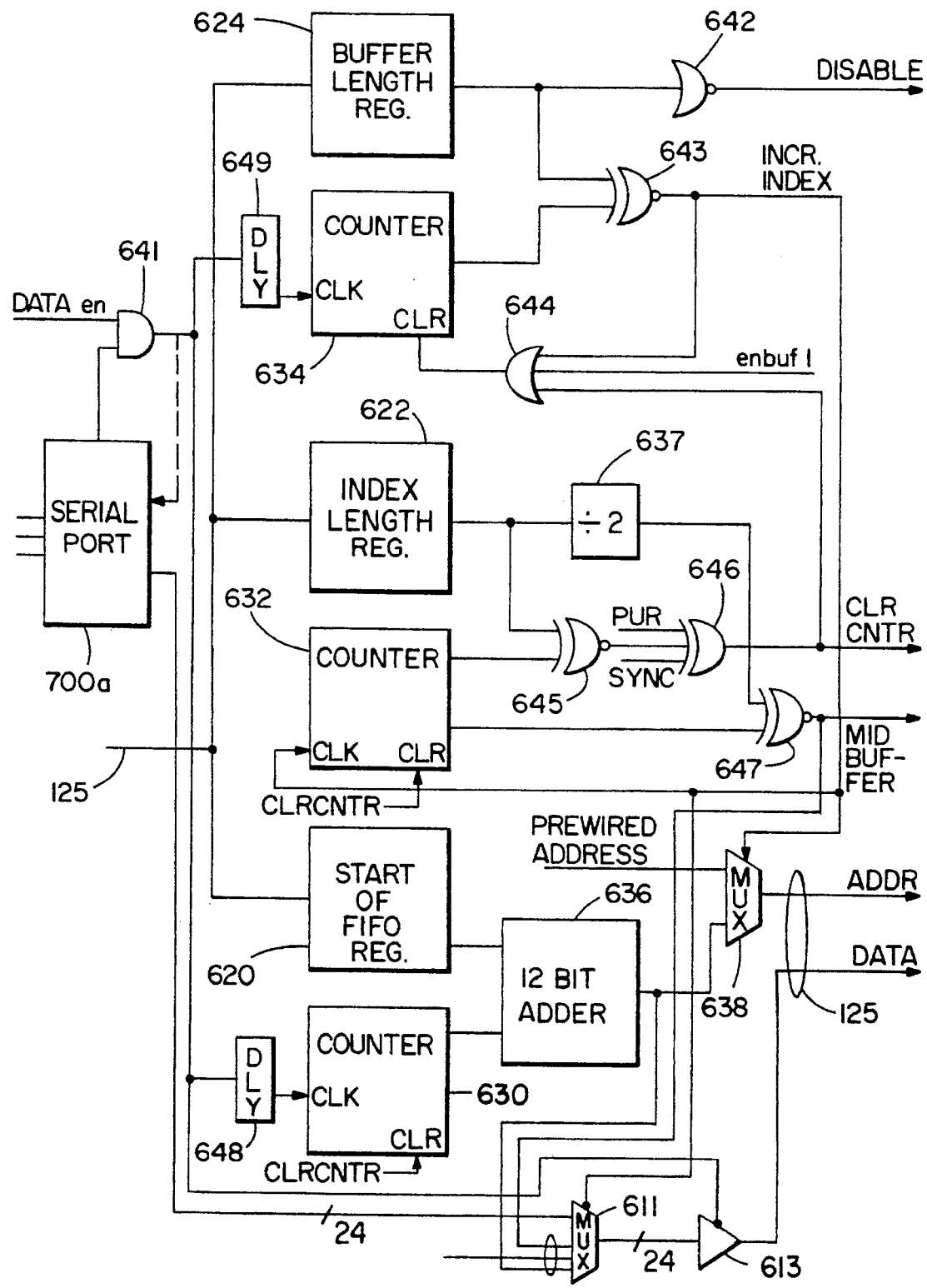
FIGS. 6a and 6b are block diagrams of the input and output sides of the data flow manager of the invention.
Figure 6B:
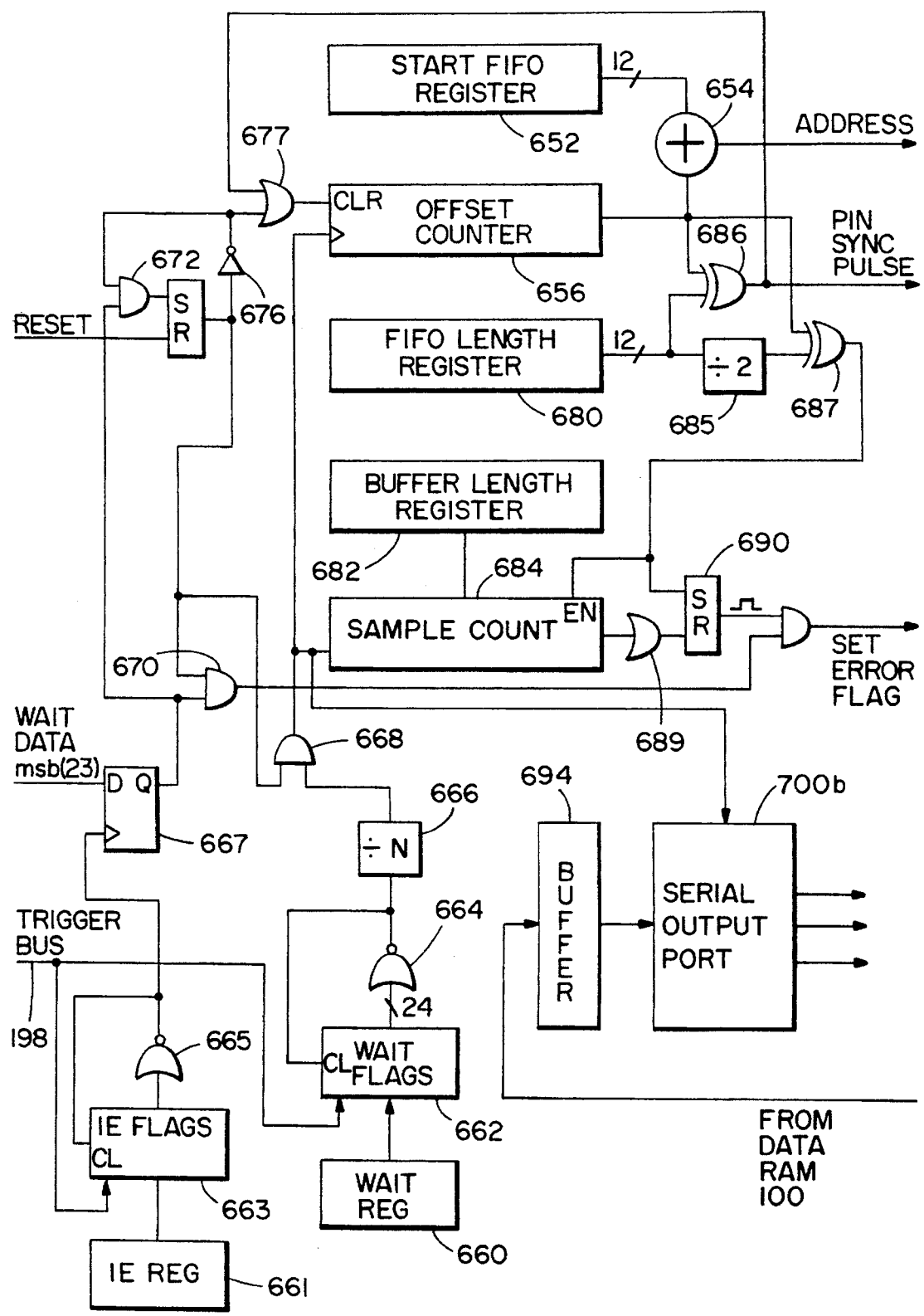
Figure 6C:
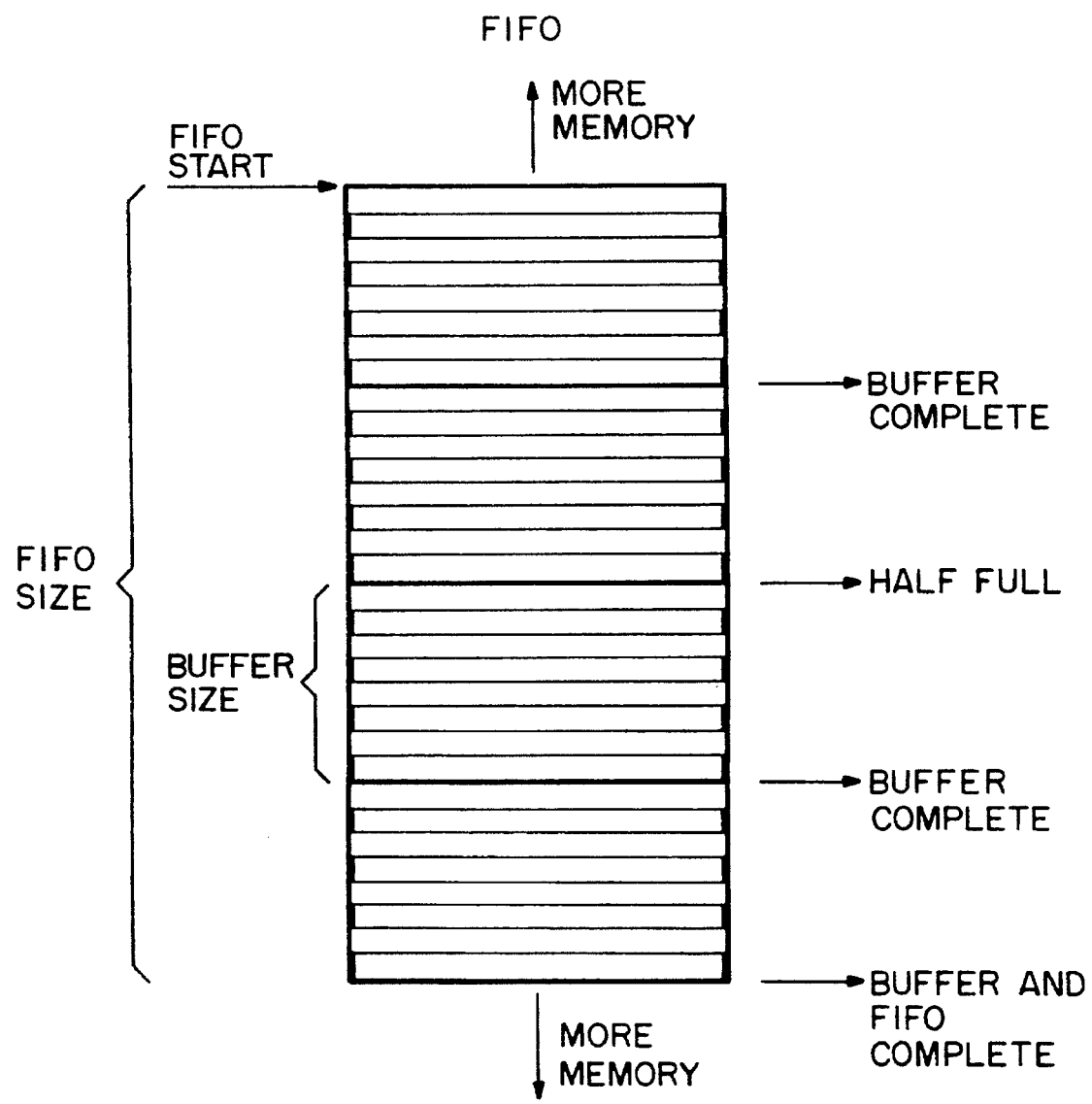
FIG. 6c is a representation of a FIFO which is implemented in the multiported data RAM, and which is utilized by the data flow manager of the invention.

Turning to FIGS. 6a, 6b, and 6c, block diagrams of the input and output circuitry of the data flow manager (DFM) 600 of the invention, and an example FIFO related to the DFM are seen. As previously described, the DFM serves the important function of handling the flow of data into and out of the processor apparatus so that GSPs of the processor apparatus need not be interrupted in their processing tasks. In accomplishing this function, the DFM takes data received by the serial port from the "world" outside of the particular processor apparatus and organizes it inside a FIFO such as the FIFO of FIG. 6c which is implemented in desired locations of the data RAM 100 of the SPROC apparatus 10. Also, the DFM 600 takes data in a FIFO, and organizes it for output to a serial output port of the SPROC apparatus. The DFM is also capable of directing data into a FIFO and drawing data from a FIFO at desired speeds so as to accommodate a decimation operation performed by the SPROC. Further, the DFM causes decoder 196 to write flags to the flag bus 198 (and hence to the GSPs 400) of the SPROC apparatus 10 regarding the status of the buffers.

The DFM 600 of the SPROC apparatus may either be central to the apparatus, or distributed among the serial input and output ports 700 of the apparatus, with a single DFM serving each port 700. Where distributed, the circuitry seen in block diagram form in FIGS. 6a and 6b is duplicated for each serial input and output port 700 of the SPROC apparatus, although certain circuitry could be common if desired.

The circuitry for receiving data from a serial port and organizing it for storage in a FIFO of the data RAM 100 is seen in FIG. 6a. The data flow itself is simple, with the data being sent from the serial port 700, via multiplexer 611 and tri-state driver 613 to the data slots of the data RAM bus 125. Multiplexer 611 permits either data coming from serial port 700a or data generated as hereinafter described to be forwarded to driver 613. Driver 613 is controlled as indicated such that data is only output on the data RAM bus 125 when the DFM 600 is enabled by the system-wide multiplexer clock scheme. The organization of the data for output onto the data RAM bus as a twenty-four bit word is conducted by the serial port 700, as hereinafter described.

Besides the data flow circuitry, each DFM is arranged with buffers, counters, gates, etc. to generate data RAM FIFO addresses for the incoming data. As shown in FIG. 6a, the DFM 600 has three registers 620, 622, 624, three counters 630, 632, and 634 associated with the three registers, an adder 636, a divide by two block 637, a multiplexer 638, seven logic gates 641, 642, 643, 644, 645, 646, and 647 (gates 642, 643, 645, and 647 being bus wide gates), and two delay blocks 648 and 649. The three registers are respectively: the start of FIFO register 620 which stores the start location in the data RAM for the FIFO to be addressed by the particular serial port coupled to the particular part of the DFM; the index length register 622 which stores the number of buffers which comprise the FIFO (for the FIFO of FIG. 6c, the index length register would be set at four), and the buffer length register 624 which stores the length of each buffer, i.e. the number of words that may be stored in each buffer (for the FIFO of FIG. 6c, the buffer length register would be set at eight). When a data word (twenty-four bits) is ready for sending to the data RAM for storage in a FIFO, the serial port 700a provides a ready signal which is used as a first input to AND gate 641. The second input to AND gate 641 is a data enable signal which is the time division multiplexed signal which permits the DFM to place a word on the data RAM bus. With the data enable and ready signals high, a high signal is output from the AND gate which causes driver 613 to output the data on the data RAM bus along with an address. The address is that which is computed by the twelve bit adder 636, or a prewired address, as will be described hereinafter.

When AND gate 641 provides a high output, the high output is delayed by delay blocks 648 and 649 before being input into clock counters 630 and 634. As a result, counters 630 and 634 increase their counts after an address has been output on the data RAM bus. When counter 630 increases its count, its count is added by the twelve bit adder 636 to the FIFO start location stored in register 620. If selected by multiplexer 638, the generated address will be the next address output in the address slots of the data RAM bus in conjunction with the data provided by driver 613. Thus, as data words continue to be sent by the serial port for storing in the data RAM FIFO, they are sent to incremental addresses of the data RAM, as the counter 630 increasingly sends a higher value which is being added to the FIFO start location. As is hereinafter discussed, the counter 630 continues to increase its count until a clear counter signal is received from circuitry associated with the index length register 622. When the clear counter signal is received, the counter starts counting again from zero.

As aforementioned, each time the AND gate 641 provides a high output, the counter 634 associated with the buffer length register 624 is also incremented (after delay). The outputs of the buffer length register 624 and its associated counter 634 are provided to bus wide XNOR gate 643 which compares the values. When the counter 634 reaches the value stored in the buffer length register 624, a buffer in the data RAM FIFO has been filled. As a result, the output of XNOR gate 643 goes high, causing three input OR gate 644 to pass a high signal to the reset of counter 634. The high signal from bus wide XNOR gate 643 is also fed to the counter 632 associated with the index length register 622, to the multiplexer 638, and to the multiplexer 611. As a result of the buffer being filled, multiplexer 638 enables the prewired address to be placed in the address slots of the data RAM bus 125, along with one of two predetermined (or generated) data words which are generated as discussed below. The placement of the prewired address and a data word on the bus at the end of buffer signal occurs upon the next data enable signal received by the DFM, which is before another word is assembled by the serial port 700a for sending to the data RAM 100. Also, the placement of the prewired address and data word is used for signalling purposes, as a decoder 196 (seen in FIG. 2) monitors the data RAM bus 125 for the particular prewired addresses of the DFMs; the triggering of these addresses occurring because of conditions in the DFM, i.e. the filling of buffers. The decoder 196 in turn, can set a flag (the setting of the flag can be dependent on the value of the data accompanying the prewired address) on the trigger bus 198 which signals the GSPs 400 of the SPROC of the occurrence. In this manner, the GSPs 400 can determine that the data required to conduct an operation is available to the GSP, thereby causing the GSP to exit a wait loop.

The predetermined or generated data word placed on the bus after a FIFO buffer has been filled preferably uses a "1" as the msb of the data word if the FIFO buffer that has been filled causes the FIFO to be half filled (as described hereinafter), or a "0" as the msb otherwise. The remainder of the data word may be null information. Or, if desired, the data word may include the next location to which the DFM will write (i.e. the location computed by the twelve bit adder 636) which is inserted in appropriate locations of the data word. This predetermined or generated data word is then passed via multiplier 611 to driver 613 which places the data word on the bus at the same time the prewired address is placed on the data RAM bus 125.

As aforementioned, when an indication of a full buffer is output by bus wide XNOR gate 643, counter 632 is incremented. Counter 632 therefore tracks the number of the buffer in the FIFO that is being filled. When the number of the FIFO buffer being addressed (as determined by counter 632) is half of the FIFO length (as determined by the length stored in register 622, divided by divide by two block 637), a flag is raised by the DFM via the bus wide XNOR gate 647. The "mid buffer" flag indicates that the buffer in the FIFO being written to is halfway through the FIFO. Hence, if all previous buffers in the FIFO are still full with data, the FIFO is half full. In addition, the mid buffer flag causes the generated data input to multiplexer 611 to be changed, such that the msb of the data is a "1" instead of a zero. Thus, upon filling the buffer which causes the FIFO to be half filled, a slightly differently coded data word is placed in the data slots of the data RAM bus.

When the value of counter 632 is incremented to the value stored in the index length register 622, the last location in the FIFO has been addressed. Accordingly, it is desirable to recirculate; i.e. to continue by addressing the first location in the FIFO. With the value of counter 632 equal to the value of register 622, bus wide XNOR gate 645 provides a high signal which is passed through three input OR gate 646. As a result, counters 630, 632, and 634 are reset. As indicated in FIG. 6a, a "clear counter" signal may also be generated by a power up reset (PUR) signal which is generated by applying a signal to a predetermined pin (not shown) of the SPROC, and by a SYNC signal which is generated by writing to address 0405H of the data RAM 100. The SYNC signal permits different DFMs to be synchronized to each other.

If desired, the input section of one DFM can be synchronized to the output section of the same or another DFM. This synchronization is accomplished via a pin (not shown) on the SPROC which generates the "en buf" input into OR gate 644. In turn, OR gate 644 provides a high signal which resets counter 634 in synchronization with the resetting of a similar counter in a DFM output section such as described with reference to FIG. 6b.

Turning to FIG. 6b, the serial output section of the DFM 600 is seen. The function of the output section of the DFM is to take data in the FIFO, and organize it for output to a serial output port 700b of the SPROC apparatus.

The output section of the DFM is preferably comprised of several registers and counters, logic elements including AND gates, comparators, and inverters, divide and add blocks, flip-flops, a buffer and a parallel to serial converter. Basically, the data flow through the serial output section of the DFM is simple. An address generated by the the start address register 652 is added by adder 654 to the value in the offset counter 656, and that address is output onto the address section of the data RAM bus. The data RAM receives the address information and then places the data located at that data RAM address on the data RAM bus. That data is received by the DFM and latched and stored in buffer 694 prior to being forwarded to the serial output port 700b.

The remaining circuitry of FIG. 6b serves the functions of not permitting the data to be forwarded to the serial output port 700b unless certain conditions (i.e. triggers) are met, as well as generating synch pulses and error flags depending on internal logic and received signals. In particular, each DFM has a wait register 660 which holds flag information which must be cleared in the wait flag register 662 before a signal will be generated. The bits in the wait flag register are only cleared upon receipt of appropriate trigger bits received from the trigger bus 198. When the appropriate flags are cleared, bus wide NOR gate 664 resets the wait flag register 662 by permitting it to be reloaded from wait register 660. The NOR gate 664 also passes the signal on to divide by N (N=0, 1, . . . , n) block. Upon the divide by N block 666 receiving N pulses from NOR gate 664, it outputs a pulse to AND gate 668. If N is one, no clock decimation occurs. However, if N is greater than one, decimation is effected; i.e. the clock is reduced to match the decimation of data which occurred in the GSP. If the other input to AND gate 668, is also high (which occurs when the DFM is running as hereinafter described), a pulse is sent to offset counter 656 which increases its count. In this manner the address output by adder 654 is changed to the next address. Likewise, when the output of AND gate 668 is high, a pulse is sent to the serial output port 700b which outputs a data signal from the DFM, and to the sample counter 684 which increases its count.

The DFM also includes a IE (initiation/error) register 661 which supplies the flag data which must be cleared by the trigger bits to the LF flag register 663. The outputs from IE flag register 663 are fed to bus wide NOR gate 665 which is used in a feedback manner to reset the IE flag register 663 so that it can be reloaded by IE register 661. The output from bis wide NOR gate 665 is also sent as the clock input into a D type flip-flop 667. The data (D) input into the D type flip-flop flop 667 should be the msb (bit twenty-three) of the data word being input into the DFM's data RAM buffer by the input side of the DFM, which is arranged to be a value "1" only when the word is being taken from the half-full location of the data RAM buffer. The value of the msb input to the D input, is then clocked over to the Q output of the flip-flop which is forwarded as the first of two inputs to each of two AND gates 670 and 672. As will be discussed hereinafter, AND gate 670 is used to set an error flag. AND gate 672, on the other hand, is used to set block 675 which is used to indicate the state of the DFM (i.e. is it presently running). If the DFM is presently causing data to be read from the data RAM and output via the DFM to a serial port, the DFM is in the running mode, and the output from block 675 is already high. As a result, inverter 676 provides a low signal to AND gate 672 which is not affected by the output from flip-flop 667. On the other hand, if the DFM is not running, the output from block 675 is low, and inverter 676 provides a high value to AND gate 672. Thus, if flip-flop 667 provides a low signal (which will happen until the buffer in the data RAM for the DFM has received enough data to be half full), the DFM will not start running. On the other hand, if flip-flop 667 provides a high signal indicating that the data RAM has now been filled halfway, block 675 changes its output and the DFM starts running.

It should be noted that when the DFM is not running, the high output from inverter 676 is forwarded via OR gate 677 to the clearing input of offset counter 656, thereby causing the address count to be generated by adder 654 to be initialized upon start-up of the DFM.

As aforementioned, AND gate 670 is used to set an error flag. Thus, if D type flip-flop 667 provides a high output while the DFM is running (as indicated by the output from block 675), AND gate 670 passes a high value to AND gate 698, which in turn will generate an error, flag if other criteria are met, as hereinafter described.

The remaining blocks of the DFM output section include a FIFO length register 680, a buffer length register 682, a sample counter 684, a divide by two block 685, comparators 686 and 687, a bus wide OR gate 689, and a set/reset block 690. The FIFO length register 682 stores the full length of the FIFO. When the value of the offset counter 656 is equal to the FIFO length stored in buffer 680, a sync pulse is generated by bus wide XNOR gate 686 which is used to synchronize the incoming data signal into an input section of a DFM with the outgoing data signal from the described output DFM. The sync pulse generated is received by the input section of the DFM (seen in FIG. 6a) as the signal enbuf1, previously described. In addition the sync pulse may be used to reinitialize the DFM by clearing the offset counter 656 and reloading the registers. When the value in the offset counter 656 is equal to one-half the value of the FIFO length register 680 (as determined by divide by two block 685), comparator 687 provides a pulse to set/reset block 690 which is indicative of the fact that the address placed on the data RAM bus is the address half-way through the data RAM buffer associated with the particular DFM. When the data RAM address is the half-full address, the data being written into the data RAM buffer should not be written into the half-full address (i.e. there should never exist a situation where the address is being written to and read from at the same time). Thus, if D type flip-flop 667 provides a high signal to AND gate 670 while the DFM is running, and the output from set/reset block 690 is also, high, AND gate 698 provides a high output which sets an error flag for the DFM.

Finally, with respect to the output side of the DFM, the buffer length register 682 stores a value equal to the length of each buffer in the data RAM FIFO associated with the DFM. The sample counter 684 is a down counter which is preloaded with the buffer length stored in register 682. When a high pulse is received from XNOR gate 687 (i.e. the offset counter is half of the FIFO length), RS flip-flop 690 is set and the down counter of sample counter 684 is enabled. Each time sample counter 684 receives a pulse from AND gate 668, the count is decremented. When the sample count goes to zero, the RS flip-flop 690 is reset. However, while the RS flip-flop 690 is set and outputs a high pulse to AND gate 698, the DFM is looking for an error. If before being reset a high msb value is seen by flip-flop 667, the DFM is apparently attempting to read and write to the same buffer location at the same time. As a result, AND gate 698 provides a high signal which sets an error flag for the DFM.

Turning to FIG. 6c, an example of a FIFO associated with the DFM is seen. The FIFOs associated with DFMs are contained in a preferably predetermined portion of the data RAM of the processor apparatus. The FIFO of FIG. 6c, as shown contains four buffers. Also as shown, each buffer contains storage for eight data samples. Thus, as shown, the FIFO of FIG. 6c has storage for thirty-two data samples. Of course, a FIFO can contain a different number of buffers, and the buffers can store different numbers of data samples. The size of the each FIFO associated with a DFM and the size of its buffers is either set automatically by intelligent software which calculates the requirements of the particular DFM, or by the user of the processor system during initial programming of the processor system.

Figure 7A:
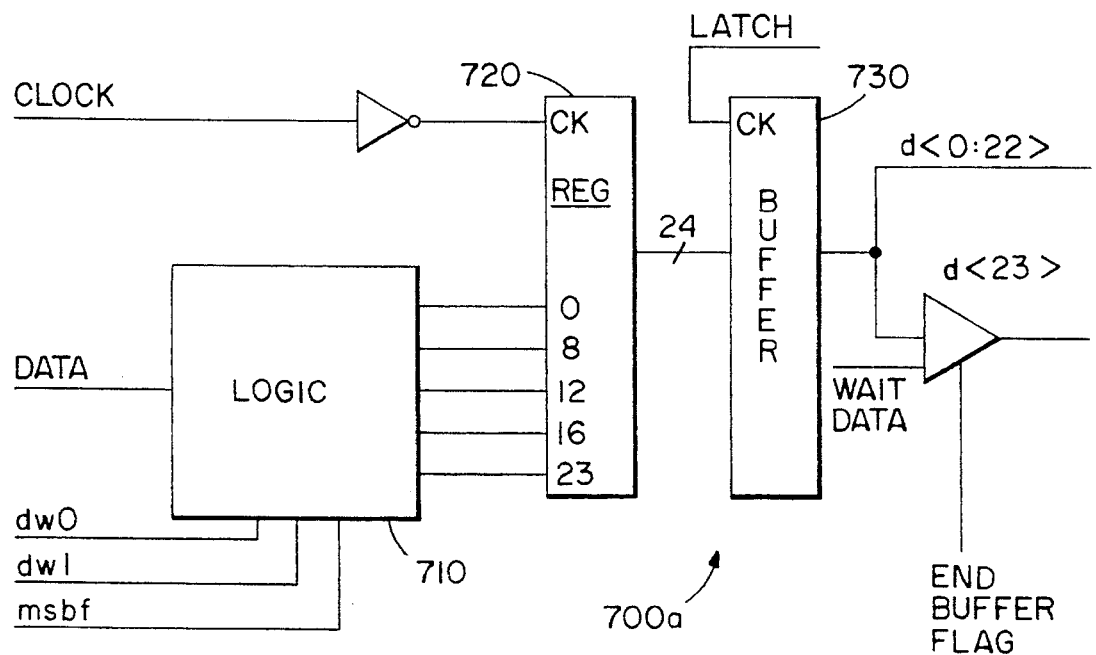
FIGS. 7a and 7b are block diagrams of the serial input and serial output ports of the invention.

Turning to FIG. 7a, a block diagram of the serial input port 700a of the invention is seen. The basic function of the serial input port is to receive any of many forms of serial data and to convert the received serial data into parallel data synchronous with the internals of the SPROC and suitable for receipt by the DFM 600 and for transfer onto the data RAM bus 125. To accomplish the basic function, the serial input port has a logic block 710, a data accumulation register 720, and a latched buffer 730. The logic block 710 and the data register 720 are governed by seven bits of information programmed into the serial input port 700a upon configuration during boot-up of the SPROC 10. The seven bits are defined as follows:

|   |             | dw1 | dw0 |                    |
|---|-------------|-----|-----|--------------------|
| 0 | dw0         | 0   | 0   | 24 bits data width |
| 1 | dw1         | 0   | 1   | 16 bits data width |
|   |             | 1   | 0   | 12 bits data width |
|   |             | 1   | 1   | 8 bits data width  |
| 2 | High: msb first    |   |   | Low: lsb first         |
| 3 | High: short strobe |   |   | Low: long strobe       |
| 4 | High: gated clock  |   |   | Low: continuous clock  |
| 5 | High: internal clock |   |   | Low: external clock  |
| 6 | High: output port  |   |   | Low: input port        |

Bits 0, 1, and 2 are used to govern the logic block 710. If the incoming data is a twenty-four bit word, the logic block takes the bits in a bit by bit fashion and forwards them to the data accumulation register 720. If the incoming data is a sixteen bit, twelve bit, or eight bit word, the logic block takes the bits of the word in a bit by bit fashion and zero fills them to extend them into a twenty-four bit word. Which bit of the received serial data is forwarded into the msb slot of the register 720 is governed by control bit 2.

Once the data is properly accumulated in register 720, it is latched into buffer 730 where it is held until it can be forwarded through the input section of the DFM 600 for storage in the multiported RAM 100. The holding of the data in the buffer 730 until the appropriate signal is received effectively causes data which is asynchronous with the SPROC 10 to become synchronized within the SPROC system.

Bits 3, 4, and 5 governing logic block 710 are respectively used to control the type of strobe, the type of clock, and the location of clock control for the input port 700, all of which are necessary for the proper communication between the SPROC and an external device. Because port 700 preferably includes the circuitry of both an input port 700a and an output port 700b (described in more detail hereinafter), an extra bit (bit 6) is used to control the functioning of port 700 as one or the other.

Figure 7B:
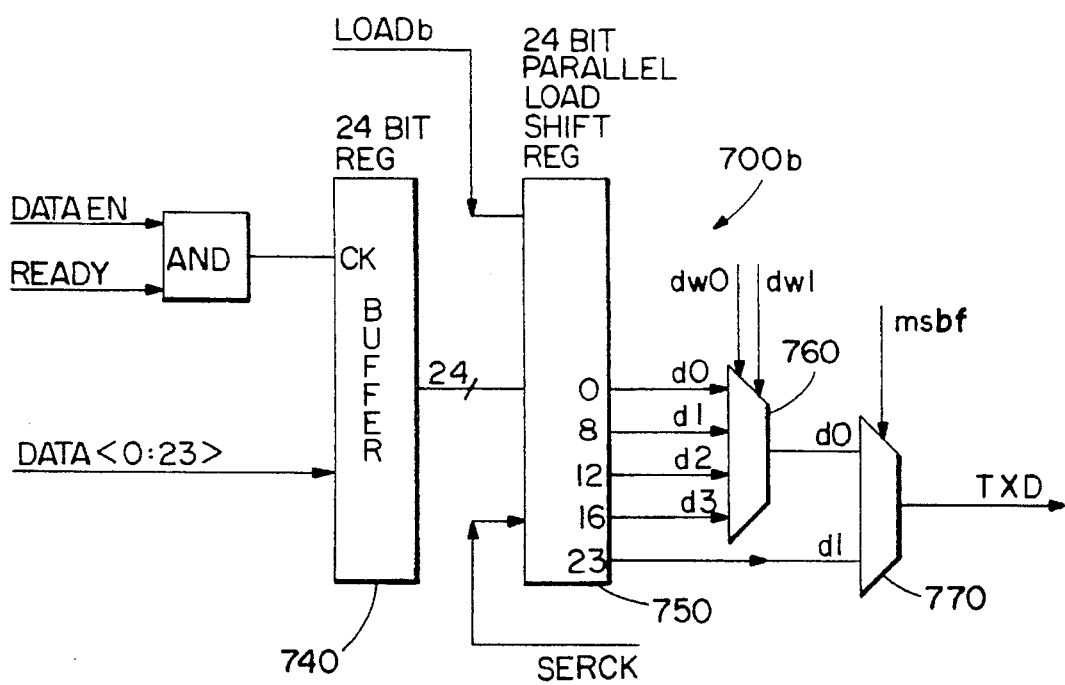

The serial data output port 700b seen in FIG. 7b is similar to the data input port 700a in many ways, except that its function is the converse. The serial output port 700b includes a buffer 740, an parallel load shift register 750, and controlled multiplexers 760 and 770. The data to be written from the SPROC via the output port 700b is received by the buffer 740 from buffer 694 of the DFM 600. The twenty-four bits received are then loaded in parallel into the parallel load shift register 750 which functions as a parallel to serial converter. The twenty-four bits are then forwarded in a bit serial fashion via multiplexer 760 which receives the control signals dw0 and dw1, and via multiplexer 770 which receives the msb control signal to the transmit data line. Multiplexers 760 and 770 effectively transform the twenty-four bit word received by the parallel load shift register into the desired format for communication with a desired device external the SPROC. The twenty-four bits may be transformed into an eight bit word (e.g. the eight msb's), a twelve bit word, or a sixteen bit word (the eight lsb's being truncated), with either the lsb or the msb being transmitted first. A twenty-four bit word may similarly be sent lsb or msb first. Where the SPROC is communicating with another SPROC (i.e. output port 700b of one SPROC is communicating with the input port 700a of another SPROC), multiplexers 760 and 770 are preferably controlled to send a twenty-four bit word, msb first.

Figure 8:
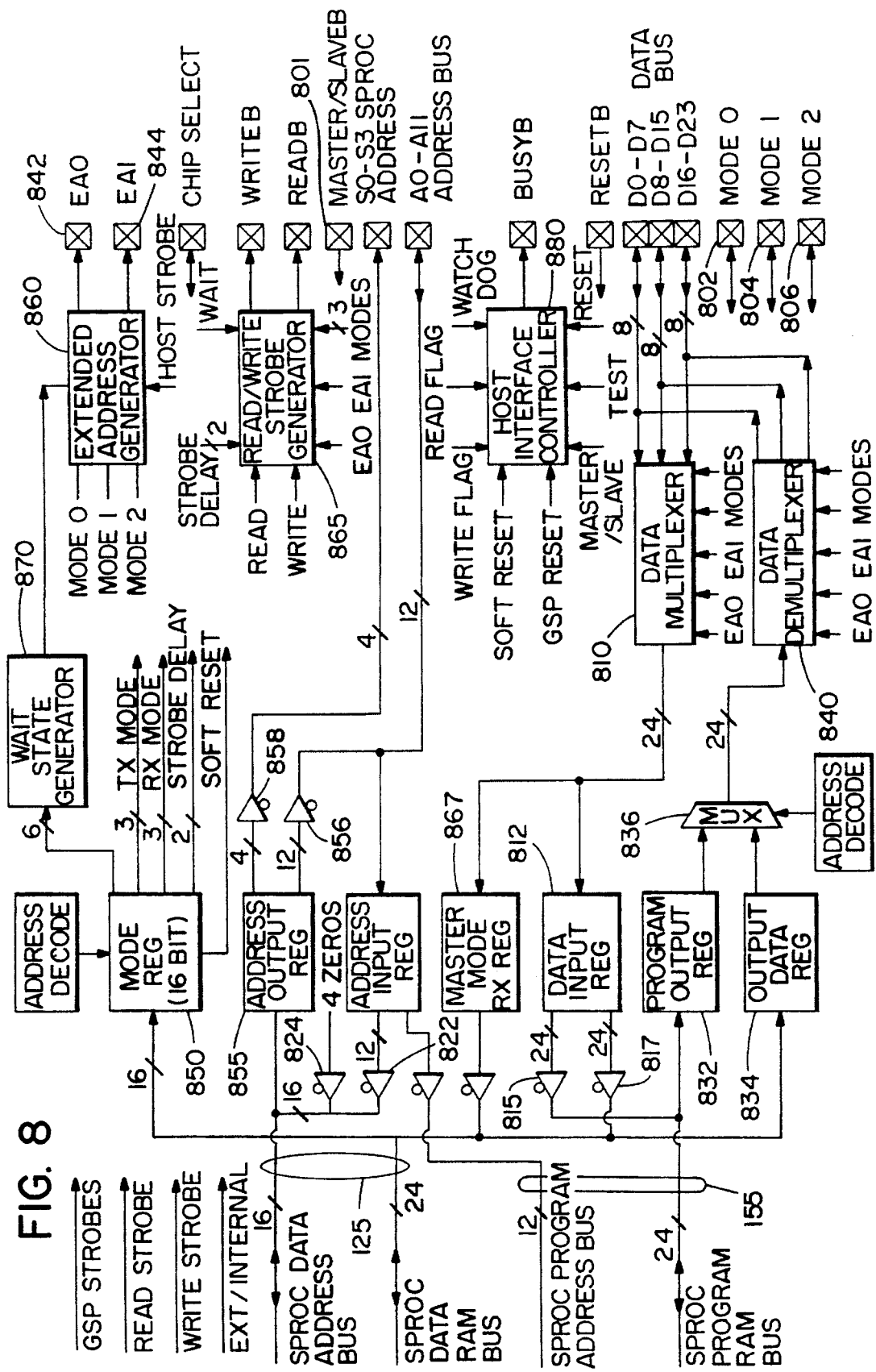
FIG. 8 is a simplified block diagram of the host port of the invention.

Turning to FIG. 8, details of the host port 800 are seen. Under most circumstances the host port 800 serves to interface the SPROC 10 with a host 180 (see FIG. 2), although where the SPROC 10 is a master SPROC which is in boot mode, host port 800 serves to interface the SPROC 10 with an EPROM and with any slave SPROCs which are part of the system. As indicated in FIG. 8, the host port 800 is coupled to the data RAM bus 125 as well as to the program RAM bus 155 on the SPROC side, while on the host side, the host port 800 is coupled to the host bus. The host bus includes three data sections D0–D7, D8–D15, and D16–D23, and three address sections A0–A11, S0–S3, and EA0–EA1. The remaining interfaces shown on the host side are pins (e.g. master/slave, reset, mode) which control the functioning of the SPROC 10 and the host port 800, and the read/write strobes for the host bus 165.

In slave mode (master/slave pin 801 set to slave mode), the SPROC 10 appears to other apparatus, including host microprocessors or DSPs as a RAM. Because it is desirable that the SPROC interface with as many different types processors as possible, the host port 800 is a bit parallel port and is arranged to interface with eight, sixteen, twenty-four, and thirty-two bit microprocessors and DSPs. The mode pins 802, 804, and 806 are used to inform the host port 800 as to whether the host processor is an eight, sixteen, twenty-four bit, or thirty-two bit processor, and whether the word being sent first is the most or least significant word.

For sending data from the host processor to the SPROC in slave mode, a data multiplexer 810, a data input register 812, and two drivers 815 and 817 are provided. The data multiplexer 810 receives three eight bit data inputs (D0–D7, D8–D15, and D16–D23) from the data bus section of host bus 165 and causes the data to be properly arranged in the data input register 812 according to the control of mode pins 802, 804, and 806. If the host processor is a thirty-two bit processor, the host port 800 of the SPROC takes two sixteen bit words and processes them in a manner described below with reference to a sixteen bit processor. Where the host processor is a twenty-four bit processor as indicated by mode pins 802 and 804, data is passed directly to the data input register 812 without adding bits or dividing bytes into segments. Where the host processor is a sixteen bit processor as indicated by mode pins 802 and 804, the host port takes sequentially takes two sixteen bits from two of the three eight bit data input lines (D0–D7, D8–D15, D16–D23), discards the eight lsb's of the least significant word, and uses the remaining bits to provide a twenty-four bit word to the data RAM bus 125 or the program RAM bus 155 of the SPROC. Where the host processor is an eight bit processor as indicated by mode pins 802 and 804, three eight bit bytes are received over the D0–D7 data input line and are concatenated in the data input register 812 in order to provide the SPROC with a twenty-four bit signal.

Regardless of how the data input register 812 is filled, after the data is assembled, the host port 800 awaits an enabling signal from the SPROC timing so that it can write its twenty-four bit word to the data RAM bus 125 via driver 817 or the program RAM bus 155 via driver 815. In this manner, the host port 800 synchronizes data to the SPROC 10 which was received in a manner asynchronous to the SPROC 10. The address to which the data is written is obtained from the twelve bit address section A0–A11 of the host bus 165. The twelve bit address is forwarded from host bus 165 to the address input register 820. When the host port 800 is enabled, if the address contained in the address input register 820 is indicative of a data RAM location, the address is placed via driver 822 on the sixteen bit address section of the data RAM bus 125. Because the address bus is a sixteen bit bus, while the address in address input register 820 is a twelve bit address, four zeros are added as the msbs of the address via driver 824 when the address and data are put on the data RAM bus. If the address contained in the address input register 820 is indicative of a program RAM location (address location 1K and below), the address is placed via driver 826 on the twelve bit address section of the program RAM bus 155.

In the slave mode, when the host processor wishes to read information from the SPROC, the host processor causes the read strobe to go low. The address received by the host port over address lines A0–A11 is read by the host port 800 and latched into the address input register 820. When the host port 800 is allowed access to the data or program RAM buses, the address is placed on the appropriate bus, and the twenty-four bit data word located at the data or program RAM address which was placed on the appropriate bus is read and latched either into the program data output register 832 or the output data register 834. That information is then forwarded via multiplexer 836 to data demultiplexer 840 arranges the twenty-four bits of information onto locations D0–D23 of the host bus 165. Demultiplexer 840 serves the opposite function of multiplexer 810. When sending data to the twenty-four bit host processor, the demultiplexer 840 simply takes its twenty-four bits and passes them unchanged. When sending data to a sixteen bit host processor, the SPROC 10 divides its twenty-four bit word into two sixteen bit words (with zero filling as appropriate). Similarly, when sending data to an eight bit host processor, the SPROC 10 divides its twenty-four bit word into three eight bit bytes.

In the master mode, on the "host" side of the host port 800 is located either an EPROM or one or more slave SPROCs. In the boot mode of master mode, data from the internal boot ROM 190 of the SPROC is written into the sixteen bit mode register 850 which is used to configure the internals of the host port 800. Then the GSP of the SPROC, which executes the program in the internal boot ROM, writes the sixteen bit addresses of the EPROM it wants to read in order to initialize the SPROC. Each address is received by the address output register 855 of the host port. The host port then sends a read strobe onto the host bus 165 and places via drivers 856 and 858 the address of the EPROM address it wishes to read. If the EPROM is an eight bit EPROM, the desired address is extended by extended address generator 860, and three read strobes are generated by the strobe generator 865 so that three eight bit bytes of the EPROM can be accessed. When the EPROM places its data onto the data locations of the host bus 165, that data is forwarded through data multiplexer 810, and is placed in a master mode receive register 867. The assembled twenty-four bit data word may then be read by the controlling GSP of the SPROC. After the word is read, the entire sequence repeats until all of the desired information stored in the EPROM is read into the SPROC.

Where the master SPROC is acting to boot up slave SPROCs as well as itself, the master SPROC follows the same boot-up procedure just described. However, upon the host port 800 receiving information in the master mode receive register 867 which is bound for a slave SPROC as determined from information previously obtained from the EPROM, the master SPROC causes that data to be written to the host bus 165 (via bus 125, GSP 400, bus 125 again, register 834 . . . as previously described) along with a sixteen bit address generated by the GSP 400 and sent to address output register 855 and then onto lines A0–A11, and S0–S3. In this manner, the data is forwarded to the appropriate SPROC so that it may be booted in a slave mode. It will be appreciated by those skilled in the art, that if the EPROM is wide enough to contain data and address information, that information can be written to host bus 165 and read directly by a slave SPROC or other device outside the memory space of the master SPROC.

Because external memories vary in speed, the host port 800 is provided with a wait state generator 870 which can lengthen the read or write strobe generated by strobe generator 865. The host port 800 is also provided with a host interface controller 880 which is essentially distributed circuitry which controls the internal timing of the host port 800.

While the SPROC 10 aforedescribed with a data RAM 100, a program RAM 150, a boot ROM 190, GSPs 400, DFMs 600, serial ports 700, and a host port 800, is a powerful programmable signal processor in its own right, it is preferable that the SPROC be able to be programmed in a "user friendly" manner. Toward that end, a compiler system which permits a sketch and realize function is provided, as described more particularly with reference to FIG. 12. In addition, an access port 900 and a probe 1000 are provided as tools useful in the development mode of the SPROC device.

Figure 9:
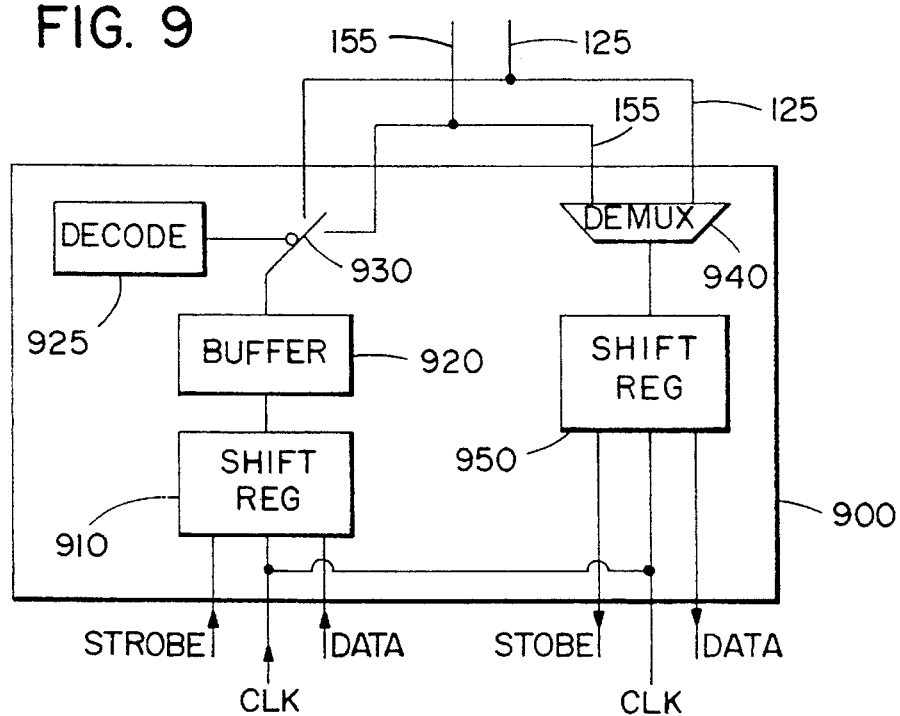
FIG. 9 is a block diagram of the access port of the invention.

As aforementioned, the access port 900 permits the user to make changes to the program data stored in RAM 150, and/or changes to other data stored in data RAM 100 while the SPROC is operating. In other words, the access port 900 permits memory contents to be modified while the SPROC is running. In its preferred form, and as seen in FIG. 9, the access port 900 is comprised of a shift register 910, a buffer 920, a decoder 925, and a switch 930 on its input side, and a multiplexer 940 and a parallel load shift register 950 on its output side. On its input side, the access port 900 receives serial data as well as a clock and strobe signal from the development host computer. The data is arranged by the shift register 910 and stored in buffer 920 until the access port is granted time division access to the data RAM bus 125 or the program RAM bus 155. A determination as to which bus the data is to be written is made by decode block 925 which decodes the msbs of the address data stored in buffer 920. The decode block 925 in turn controls switch 930 which connects the buffer 920 to the appropriate bus. The msbs of the address data in the buffer 920 are indicative of which RAM for which the data is destined, as the data RAM and program RAM are given distinct address spaces, as previously described.

On the output side, data received via the program RAM bus 155 or the data RAM bus 125 is forwarded via demultiplexer 940 to a shift register 950. The shift register 950 effects a parallel to serial conversion of the data so that serial data may be output together with an appropriate strobe and according to an external clock to a development host computer or the like.

By providing the ability to write and read data to the program and data RAMs, the access port 900 has several uses. First, by writing to a particular location (e.g. 406, or 408–40*b* Hex) in the data RAM, a program break can be initiated. The contents of the various registers of the GSPs which are written into data RAM as a result of the break can than be read. This information is particularly important in the debugging process. Second, if desired, the contents of the registers of the GSPs (as stored in the data RAM) can be modified prior to exiting the break mode by writing data to desired data RAM locations, thus providing an additional tool in the debugging process. Third, if desired, the program (including microinstructions and/or parameters stored as part of microinstructions) stored in the program RAM itself can be altered "on the fly", and can provide the developer with the ability to monitor (in conjunction with the probe 1000 hereinafter described) how a change in a parameter(s) or a change in the program could effect the functioning of the SPROC.

Figure 10:
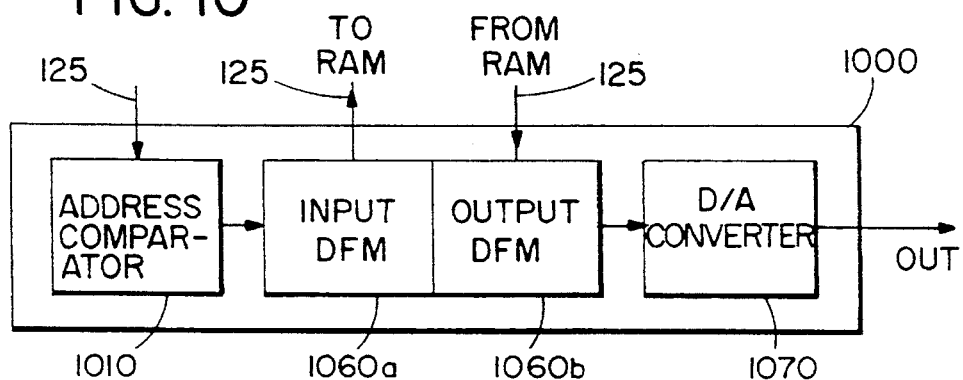
FIG. 10 is a block diagram of the probe of the invention.

The probe 1000 seen in FIG. 10 permits the user to see internal signals generated by the SPROC by monitoring the data RAM bus 125 and capturing the values of data written to one or more data RAM locations. The probe 1000 is generally comprised of a comparator 1010, a DFM 1060 with an input section 1060*a* and an output section 1060*b*, and a digital to analog converter 1070. The comparator 1010 is programmable such that any data RAM address may be monitored. The data RAM address is monitored by coupling the comparator 1010 to the data RAM bus 125 and comparing via XNOR gates (not shown) the programmed address to the addresses placed on the bus. When the addresses match, and it is determined that data is being written to the data RAM as opposed to being read from the data RAM, the data is read into the input DFM section 1060*a* which stores the data until the probe is granted access for writing data to the data RAM 100. At that time, the probe 1000 writes the data to its own buffer in the data RAM. When the probe 1000 is granted access for reading data from the data RAM 100, the output DFM section 1060*b* of the data probe 1000 pulls the data from its data RAM buffer at the speed set by the output DFM section's divide by N block. The data is then forwarded to the D/A converter 1070 where it is converted into analog format so that it can be viewed on an oscilloscope. In this manner, signals which are being written to any data RAM location may be monitored in real time as desired. By using the access port 900 and the probe 1000 together, the affect of a change of a parameter value entered via the access port 900 may be immediately viewed as an analog signal via probe 1000.

Figure 11:
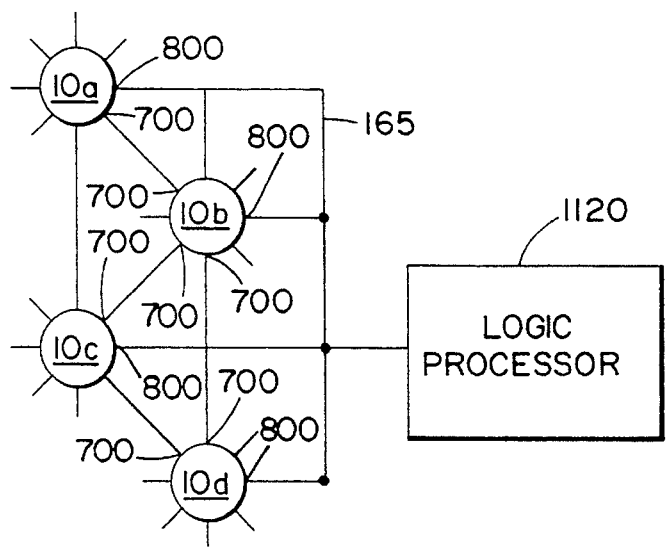
FIG. 11 is a simplified diagram illustrating the coupling of a plurality of SPROC devices of the invention into a system acting as the front end to a logic processor.

As seen in FIG. 11, a plurality of SPROC devices 10*a*, 10*b*, 10*c*, . . . may be coupled to together as desired to provide a system of increased signal processing capabilities. Typically, the SPROC devices are coupled and communicate with each other via their serial ports 700, although it is possible for the SPROCs to communicate via their parallel host ports 800. The system of SPROCs can act as a powerful signal processing front end to a logic processor 1120, or if desired, can interface directly with electro-mechanical or electronic components.

The format of the disclosed SPROC devices 10 and systems readily lend themselves to a sketch and realize function where a user may utilize a cell library of parameterizable signal processing functions in conjunction with a programming language in order to realize in silicon a desired signal processor or processing system. As seen in Appendix A hereto, among the signal processing functions provided are a multiplier, a summing junction, an amplifier, an integrator, a phase locked loop, an IIR filter, a FIR filter, an FFT, rectifiers, comparators, limiters, oscillators, waveform generators, etc. A programming language is also provided to permit the user to define his own functions. The user of the development system has a choice of numerous icons which represent functional blocks. Through the use of a computer mouse, the symbols can be placed on a screen and coupled together in a block diagram format as desired. The user is be able to parameterize each block. When the user schematic is complete, the development system automatically compiles the information in an optimized manner, and downloads the program (which realizes the sketched diagram) via an RS232 link and interface circuitry (not shown) coupled to the host or access ports of one or more integrated signal processors. The compiler not only produces automatic code for the integrated signal processor(s), but also a symbol table listing all of the defined variables together with their internal addresses in the data RAMs. Writing to those addresses will then change the values of those parameters. For example, if a write is made to the address corresponding to "volume", the gain of the amplifier will change to a new value.

Figure 12:
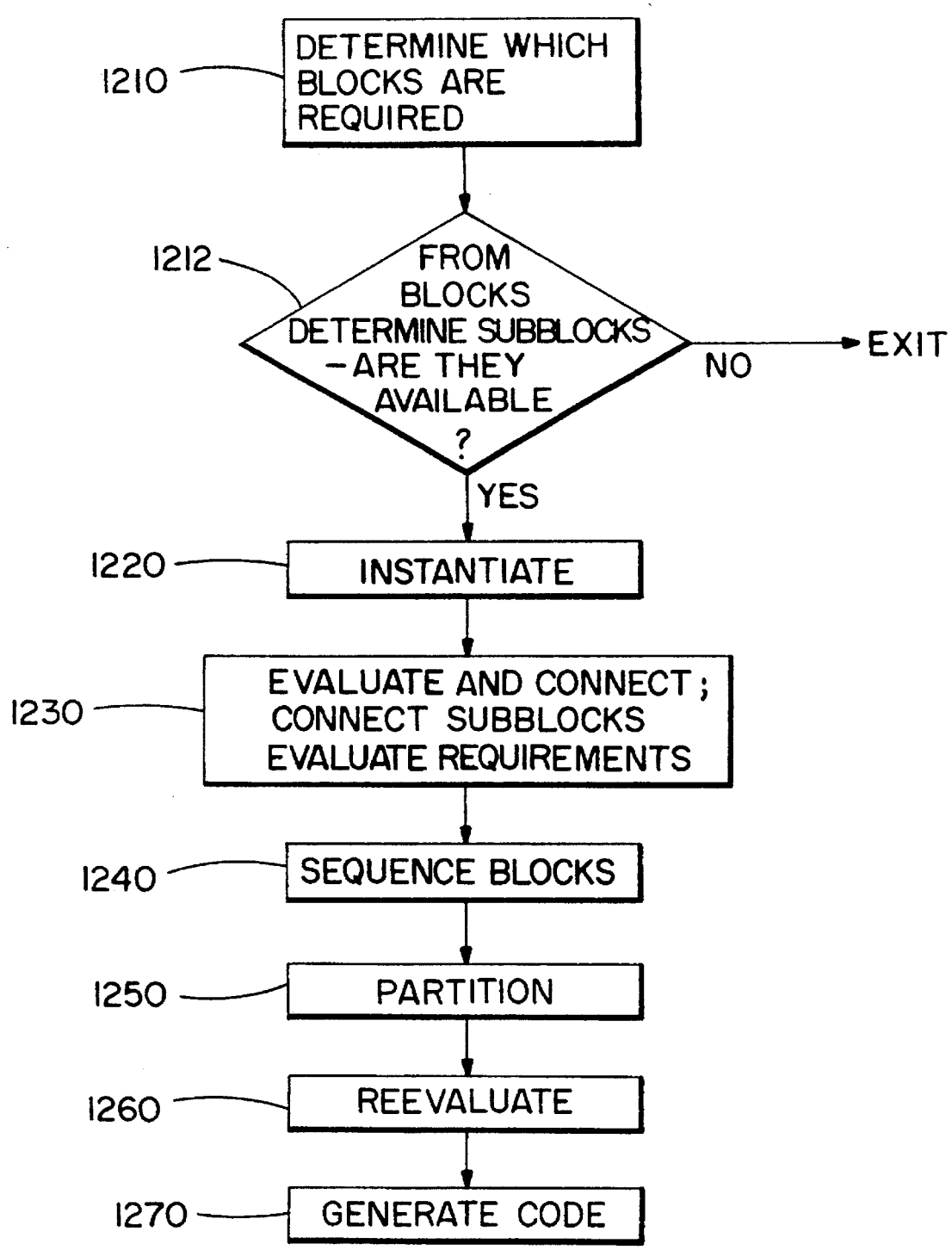
FIG. 12 is a high level flow chart of the compiler utilized in the development system of the invention.

A high level flow diagram of the compiler preferably used in conjunction with the SPROC 10 of the invention is seen in FIG. 12. When the user of the development system wishes to compile a design, the user runs the compiler with an input file containing the design. The compiler first determines at 1210 which of its various library blocks are needed. Because some of the library blocks will need sub-blocks, the compiler determines at 1212 which sub-blocks (also called child blocks) are required and whether all the necessary library block files can be read in. If they can, at 1220 the compiler creates individual instances of each block required, since the same block may be used more than once in a design. Such a block may be called with different parameters which would thereby create a different version of that block. The instances generated at step 1220 are represented within the compiler data structures as a tree, with the top level block of the user's design at the root of the tree. At 1230, the compiler evaluates the contents of each instance, and establishes logical connects between the inputs and outputs of child instances and storage locations in higher level instances. In evaluating an instance, the compiler determines code and data storage requirements of that instance, and assembles the assembly language instructions which comprise the lowest level child instances. At 1240, the compiler sequences the instances by re-ordering the list of child instances contained in each parent instance. This is the order in which the set of program instructions associated with each lowest level child instance will be placed in the program memory 150 of the SPROC 10. To do this, the compiler traces forward from the inputs of the top level instance at the root of the tree, descending through child blocks as they are encountered. When all inputs of an instance have been reached, the instance is set as the next child instance in the sequence of its parent instance. Feedback loops are detected and noted. At 1250, the compiler partitions the design over multiple GSPs 400. Successive child instances are assigned to a GSP until adding one more instance would require the GSP to take more than its allowed processing time; i.e. one sample period. Succeeding child instances are assigned to a new GSP, and the process continues until all the instances are assigned to respective GSPs. As pare of the partitioning step 1250, the compiler inserts instances of phantom blocks at the correct points in a child sequence. Phantom blocks are blocks which are not designated by the user, but which are necessary for the correct functioning of the system; e.g. blocks to implement software FIFOs which pass signals form one GSP to the next GSP in the signal flow. At step 1260, the compiler reevaluates the instances so that the phantom block instances added at step 1250 will be fully integrated into the instance tree data structure of the compiler. Then, at 1270, the compiler generates code by traversing the instance tree in the sequence determined at step 1240, and when each lowest level child instance is reached, by outputting to a file the sequence of SPROC instructions assembled for that instance. It also outputs to a second file desired initialization values for the data storage required at each instance. It further outputs to a third file the program and data locations referenced by various symbolic names which were either given by the user or generated automatically by the compiler to refer to particular aspects of the design.

Once the SPROC is programmed, the development system permits the user to interactively debug the device. Thus, the aforedescribed probe 1000 is effectuated by a command line editor on the development system host. Typing in the name of a node on the schematic (block diagram), "moves" the probe to that point. The output of this probe is monitorable by an oscilloscope attached to a fixed pin of the integrated signal processor. Similarly, the command line editor may be used to modify parameters. Parameter modification can either be typed in or down loaded from a file. This facility allows the user, for example, to move pole and zero locations in a feedback system and observe the effect in real time.

When the designer has finished the optimization of his system, the development system produces a file which may be stored in an EPROM 170. Upon powering up of the SPROC 10, the EPROM 170 is coupled to the host port 800 of the SPROC, and the file contained in the EPROM 170 is used to program the device.

There have been described and illustrated herein a signal processor and signal processor system which permit instantaneous realization in silicon of a customized signal processing device. While particular embodiments have been described, it is not intended that the invention be limited thereto as it is intended that the invention be as broad in scope as the art will allow. Thus, while a SPROC utilizing multiple GSPs was described, it will be appreciated that by using an expanded, more powerful, single GSP in conjunction with the multiported data RAM, the program RAM, the DFM, etc., many of the advantages of the architecture will still be realized. Further, while particular RAM sizes, bus sizes, FIFO lengths, etc. were described, it will be appreciated that these are design choices and could vary depending upon the requirements of the designer. Also, While particular circuitry was disclosed for the GSP, the DFM, and the RAM bus decoder for the trigger bus system, and while particular blocks were shown for the serial ports, the host port, the access port, and the probe, it will be appreciated that the functions encompassed by the circuitry and blocks can be implemented in different manners to achieve the same or similar results. Therefore, it will be appreciated by those skilled in the art that yet other modifications could be made to the provided invention without deviating from its spirit and scope as so claimed.

We claim:

1. A programmable, real time, signal processor apparatus designed for semiconductor integration, which receives regularly clocked data signals from means external said signal processor apparatus, and processes said data signals in a real time fashion, thereby generating processed data signals which are available external to said processor apparatus as regularly clocked output signals, comprising:

a) at least one data signal receiving means for receiving said regularly clocked data signals from said means external said signal processor apparatus;

b) a multiported central memory unit coupled to said data signal receiving means for storing said received data signals, said data signal receiving means including means for regularly forwarding said received data signals to desired locations in said multiported central memory unit;

c) a plurality of digital processor means coupled to said multiported central memory unit, for obtaining said data signals from said multiported central memory unit, for processing said data signals thereby generating processed data signals, and for sending said processed data signals for storage in said multiported central memory unit;

d) a program memory means coupled to said plurality of digital processors for storing microinstructions for said plurality of digital processors, wherein said digital processors process said data signals according to said microinstructions stored in said program memory means;

e) at least one output port coupled to said multiported central memory unit for obtaining said processed data signals from said multiported central memory unit and providing said processed data signals as regularly clocked output signals to means external to said processor apparatus; and f) at least one data bus coupling said plurality of digital processor means, said at least one output port, and said at least one data signal receiving means to said multiported central memory unit, wherein substantially all data received by said data receiving means is forwarded via said at least one data bus to said multiported central memory unit, obtained from said multiported central memory unit via said at least one data bus and processed by at least one of said plurality of digital processor means to generate said processed data signals, and said processed data signals are forwarded via said at least one data bus to said multiported cental memory unit for either obtaining via said at least one data bus by at least one of said plurality of digital processor means for additional processing or for obtaining via said at least one data bus and output by said at least one output port as a regularly clocked output signal at a rate related to the rate of said received regularly clocked data signals.

2. A processor apparatus according to claim 1, wherein:

said multiported central memory unit comprises a data RAM, and said at least one data bus comprises a data RAM bus, wherein said plurality of digital processors, said data signal receiving means and said output port are coupled to said data RAM bus, whereby access to said data RAM bus is time division multiplexed.

3. A processor apparatus according to claim 2, further comprising:

g) a program bus coupled to said program memory means, and said plurality of digital processors, whereby access to said program bus by said plurality of digital processors is time division multiplexed.

4. A processor apparatus according to claim 2, further comprising:

g) a logic control port for obtaining at least said microinstructions; and h) a program bus coupled to said program memory means, wherein said program memory means is programmed in a boot mode of said processor apparatus by forwarding said microinstructions from means external to said processor apparatus through said logic control port and over said program bus to said program memory means.

5. A processor apparatus according to claim 4, wherein:

said logic control port comprises a host port, said host port being coupled to said program memory means via said program bus and coupled to said data RAM via said data RAM bus.

6. A processor apparatus according to claim 5 in conjunction with a parallel host bus coupled to said host port, wherein said program bus and said data RAM bus are bit parallel buses.

7. A processor apparatus according to claim 5 in conjunction with a programmed ROM, said programmed ROM constituting said means external to said processor apparatus, wherein said programmed ROM contains said microinstructions for said program memory means and further contains configuration information for said data RAM, said data signal receiving means, and said output port, and parametric data for said data RAM, said microinstructions, configuration information, and parametric data having been compiled into said programmed ROM, and wherein in a master mode of said processor apparatus said processor apparatus reads said microinstructions from said programmed ROM via said logic control port and sends said microinstructions to said program memory means for storage therein via said program bus, reads said configuration information from said programmed ROM via said logic control port and sends said configuration information appropriately to said data RAM, to said data signal receiving means, and to output port via said data RAM bus, and reads said parametric data from said programmed ROM via said logic control port and sends said parametric data to said data RAM.

8. A processor apparatus according to claim 7, further comprising:

i) a boot ROM, said boot ROM being coupled to one of said plurality of digital processor means when said processor apparatus is a master processor apparatus in boot mode, said boot ROM containing boot microcode for causing said digital processor coupled to said boot ROM to control said logic control port and to obtain said microinstructions, configuration information, and parametric data from said programmed ROM.

9. A processor apparatus according to claim 2, further comprising:

g) a data access port coupled to said data RAM via said RAM bus for writing to and/or reading from, via said RAM bus, at least one location of said data RAM.

10. A processor apparatus according to claim 9, wherein:

said data access port is further coupled to said program memory means, and said data access port writes to and/or reads from at least one location of said program memory means.

11. A processor apparatus according to claim 8, further comprising:

j) a data access port coupled to said data RAM unit via said RAM bus for writing to and/or reading from, via said RAM bus, at least one location of said data RAM.

12. A processor apparatus according to claim 9, wherein:

said data access port is further coupled to said program memory means, and said data access port writes to and/or reads from at least one location of said program memory means.

13. A processor apparatus according to claim 2, further comprising:

g) a probe for monitoring a desired address of said data RAM, for obtaining and converting data at said desired address into an analog signal and for supplying said analog signal to a means external said processor apparatus.

14. A processor apparatus according to claim 13, wherein:

said data RAM bus is comprised of a plurality of data lines and a plurality of address lines, and said probe comprises, comparator means coupled to said address lines of said data RAM bus for comparing said desired address of said data RAM which is to be probed with addresses appearing on said address lines of said data RAM bus, means for writing data appearing on said data lines of said data RAM bus to a predetermined location in said data RAM when said comparator means finds a match between said desired address and one of said addresses appearing on said address lines of said data RAM bus, means for reading said data written to said predetermined location of said data RAM, and means for converting said data read from said predetermined location of said data RAM into an analog signal.

15. A processor apparatus according to claim 9, further comprising:

h) a probe for monitoring a desired address of said data RAM, for obtaining and converting data at said desired address into an analog signal and for supplying said analog signal to means external said processor apparatus.

16. A processor apparatus according to claim 15, wherein:

said data RAM bus is comprised of a plurality of data lines and a plurality of address lines, and said probe comprises, comparator means coupled to said address lines of said data RAM bus for comparing said desired address of said data RAM which is to be probed with addresses appearing on said address lines of said data RAM bus, means for writing data appearing on said data lines of said data RAM bus to a predetermined location in said data RAM when said comparator means finds a match between said desired address and one of said addresses appearing on said address lines of said data RAM bus, means for reading said data written to said predetermined location of said data RAM, and means for converting said data read from said predetermined location of said data RAM into an analog signal.

17. A processor apparatus according to claim 11, further comprising:

k) a probe for monitoring a desired address of said data RAM, for obtaining and converting data at said desired address into an analog signal and for supplying said analog signal to means external said processor apparatus.

18. A processor apparatus according to claim 17, wherein:

said data RAM bus is comprised of a plurality of data lines and a plurality of address lines, and said probe comprises, comparator means coupled to said address lines of said data RAM bus for comparing said desired address of said data RAM which is to be probed with addresses appearing on said address lines of said data RAM bus, means for writing data appearing on said data lines of said data RAM bus to a predetermined location in said data RAM when said comparator means finds a match between said desired address and one of said addresses appearing on said address lines of said data RAM bus, means for reading said data written to said predetermined location of said data RAM, and means for converting said data read from said predetermined location of said data RAM into an analog signal.

19. A processor apparatus according to claim 1, wherein:
said at least one data signal receiving means comprises a plurality of data signal receiving means,
said at least one output port coupled to said multiported central memory unit comprises a plurality of output ports, and
said plurality of data signal receiving means and said plurality of ports each include interface means for making said plurality of data signal receiving means and said plurality of ports compatible with the clocking and bit width of a plurality of different means external said processor apparatus.

20. A processor apparatus according to claim 8, wherein:
said at least one data signal receiving means comprises a plurality of data signal receiving means,
said at least one output port coupled to said multiported central memory unit comprises a plurality of output ports, and
said plurality of data signal receiving means and said plurality of ports each include interface means for making said plurality of data signal receiving means and said plurality of ports compatible with the clocking and bit width of a plurality of different means external said processor apparatus.

21. A processor apparatus according to claim 18, wherein:
said at least one data signal receiving means comprises a plurality of data signal receiving means,
said at least one output port coupled to said multiported central memory unit comprises a plurality of output ports, and
said plurality of data signal receiving means and said plurality of ports each include interface means for making said plurality of data signal receiving means and said plurality of ports compatible with the clocking and bit width said plurality of different means external said processor apparatus.

22. A processor apparatus according to claim 20, wherein:
each of said plurality of data signal receiving means includes means for writing data to respective desired first addresses in said data RAM in a repeated sequential fashion, and
each of said plurality of output ports includes means for obtaining in a repeated sequential fashion said processed data signals from respective second addresses of said data RAM.

23. A processor apparatus according to claim 21, wherein:
each of said plurality of data signal receiving means includes means for writing data to respective desired first addresses in said data RAM in a repeated sequential fashion, and
each of said plurality of output ports includes means for obtaining in a repeated sequential fashion said processed data signals from respective second addresses of said data RAM.

24. A system comprising a plurality of said processor apparatuses of claim 3, wherein a first of said plurality of said processor apparatuses has its output port coupled to the data signal receiving means of at least a second of said plurality of said processor apparatus.

25. A system according to claim 24, wherein one of said processor apparatuses is a master processor apparatus, all other processor apparatuses being slave processor apparatuses, and wherein said master processor apparatus and said slave processor apparatuses all each further comprise
  g) a host port for receiving microinstructions for the respective processor apparatus; and
  h) a program bus coupling said host port and said program memory means of respective processor apparatuses,
  said host port being coupled to said data RAM via said data RAM bus of the respective processor apparatus,
  wherein said program memory means of respective slave processor apparatuses are programmed in a boot mode by forwarding said microinstructions from means external to said slave processor apparatuses through said host port, over said program bus and to said program memory means.

26. A system according to claim 25 in conjunction with a programmed ROM, said programmed ROM constituting said means external to said slave processor apparatuses and coupled to said master processor apparatus in boot mode,
wherein said programmed ROM contains said microinstructions for said program memory means of said master processor apparatus and said slave processor apparatuses and further contains configuration information for said data RAM, said data signal receiving means, and said output port of said master and slave processor apparatuses, and parametric data for said data RAM of said master processor apparatus and said slave processor apparatuses, said microinstructions configuration information, and parametric data having been compiled into said programmed ROM, and
wherein said master processor apparatus reads said microinstructions from said programmed ROM via the host port of said master processor apparatus and sends said microinstructions to respective program memory means of said master and slave processor apparatus for storage therein via respective program memory buses, and said master processor apparatus reads said configuration information from said programmed ROM via said master processor apparatus host port and sends said configuration information appropriately to said data RAM, said data signal receiving means, and said output port, of said respective master and slave processor apparatuses via respective data RAM buses, and said master processor apparatus reads said parametric data from said programmed ROM via said master processor apparatus host port and sends said parametric data to appropriate data RAMs of said respective master and slave processor apparatuses via respective data RAM buses.

27. A system according to claim 26, wherein:
said master processor apparatus further comprises a boot ROM, said boot ROM being coupled to one of said digital processors of said master processor apparatus when said master processor apparatus is in boot mode, said boot ROM containing boot microcode for causing said digital processor to control said host port of said master processor apparatus and to obtain said microinstructions, configuration information, and said parametric data from said programmed ROM.

28. A processor apparatus according to claim 25, wherein:
at least one of said master processor apparatus and said slave processor apparatuses includes a data access port coupled to a respective data RAM via a respective data RAM bus for writing to and/or reading from, via said data RAM bus, at least one location of the respective data RAM.

29. A processor apparatus according to claim 28, wherein:
said data access port is further coupled to a respective program memory means, and said data access port writes to and/or reads from at least one location of said respective program memory means.

30. A processor apparatus according to claim 25, wherein:

at least one of said master processor apparatus and said processor apparatuses includes a probe for monitoring a desired address of the data RAM of the respective processor apparatus of the probe, for obtaining and converting data at said desired address into an analog signal and for supplying said analog signal to a means external said processor apparatus.

31. A processor apparatus according to claim 30, wherein:

said data RAM buses of said master and slave processor apparatuses are comprised of a plurality of data lines and a plurality of address lines, and said probe comprises, comparator means coupled to said address lines of said respective data RAM bus for comparing said desired address of said RAM which is to be probed with addresses appearing on said address lines of said data RAM bus, means for writing data appearing on said data lines of said data RAM bus to a predetermined location in said data RAM when said comparator means finds a match between said desired address and one of said addresses appearing on said address lines of said data RAM bus, means for reading said data written to said predetermined location of said data RAM, and means for converting said data read from said predetermined location of said data RAM into an analog signal.

32. A programmable real time signal processor apparatus designed for semiconductor integration, which receives regularly clocked data signals from means external said signal processor apparatus, and processes said regularly clocked data signals thereby generating processed data signals which are available external to said processor apparatus as regularly clocked output signals, comprising:

a) at least one data signal receiving means for receiving said regularly clocked data signals from said means external said signal processor apparatus, each data signal receiving means including means for writing data to a plurality of desired first address locations in a multiported central memory unit in a repeated sequential fashion;

b) said multiported central memory unit coupled to said at least one data signal receiving means, said multiported central memory unit for storing said received data signals;

c) a digital processor means coupled to said multiported central memory unit, for obtaining said data signals from said first addresses of said multiported central memory unit, for processing said data signals and thereby generating processed data signals, and for sending said processed data signals for storage in second address locations of said multiported central memory unit;

d) at least one data output means coupled to said multiported central memory unit, for obtaining in a repeated sequential fashion said processed data signals from said second address locations of said multiported central memory unit at a rate related to the rate of said regularly clocked data signals, and for providing said processed data signals as regularly clocked output signals available external to said processor apparatus, wherein substantially all signal data received by said processor apparatus flows directly from said at least one said data signal receiving means to said multiported central memory unit and said digital processor means obtains data signals for processing substantially only from said multiported central memory unit and provides said processed data signals substantially only to said multiported central memory unit, and wherein said data signal receiving means and said output means handle data flow into and out of said processor apparatus and permit said digital processor means to function substantially free of data input interrupts.

33. A processor apparatus according to claim 32, wherein:

said multiported central memory unit comprises a data RAM and a data RAM bus, wherein said digital processor means, said data signal receiving means, and said output means are coupled to said data RAM bus, whereby access to said data RAM bus is time division multiplexed.

34. A processor apparatus according to claim 32, wherein:

said multiported central memory unit comprises a data RAM and a data RAM bus, and said digital processor means, said data signal receiving means, and said output means are coupled to said data RAM bus, said processor apparatus further comprising, e) a program memory means coupled to said digital processor means for storing microinstructions for said digital processor means, wherein said digital processor means processes said data signals according to said microinstructions stored in said program memory.

35. A processor apparatus according to claim 34, further comprising:

f) a program bus coupled to said program memory means, and said digital processor.

36. A processor apparatus according to claim 35, further comprising:

g) a logic control port for obtaining at least said microinstructions;

wherein said program memory means is programmed in a boot mode of said processor apparatus by forwarding said microinstructions from means external to said processor apparatus through said logic control port and over said program bus to said program memory means.

37. A processor apparatus according to claim 36, wherein:

said logic control port comprises a host port, said host port being coupled to said program memory means via said program bus and coupled to said data RAM via said data RAM bus.

38. A processor apparatus according to claim 37 in conjunction with a parallel host bus coupled to said host port, wherein said program bus and said data RAM bus are bit parallel buses.

39. A processor apparatus according to claim 36 in conjunction with a programmed ROM, said programmed ROM constituting said means external to said processor apparatus, wherein said programmed ROM contains said microinstructions for said program memory means and further contains configuration information for said data RAM, said data signal receiving means, and said output means, and parametric data for said data RAM, said microinstructions, configuration information, and parametric data having been compiled into said programmed ROM, and wherein in a master mode of said processor apparatus said processor apparatus reads said microinstructions from said programmed ROM via said host port and sends said microinstructions to said program memory means for storage therein via said program bus, reads said configuration information from said programmed ROM via said host port and sends said configuration information appropriately to said data RAM, to said data signal receiving means, to send means for writing data, and to said data output means via said data RAM bus, and reads said parametric data from said programmed ROM via said host port and sends said parametric data to said data RAM.

40. A processor apparatus according to claim 39, further comprising:

h) a boot ROM, said boot ROM being coupled to said digital processor means when said processor apparatus is a master processor apparatus in boot mode, said boot ROM containing boot microcode for causing said digital processor means coupled to said boot ROM to control said logic control port and to obtain said microinstructions, configuration information, and parametric data from said programmed ROM.

41. A processor apparatus according to claim 34, further comprising:

f) a data access port coupled to said data RAM via said RAM bus for writing to and/or reading from, via said RAM bus, at least one location of said data RAM.

42. A processor apparatus according to claim 41, wherein:

said data access port is further coupled to said program memory means, and said data access port writes to and/or reads from at least one location of said program memory means.

43. A processor apparatus according to claim 40, further comprising:

i) a data access port coupled to said data RAM unit via said RAM bus for writing to and/or reading from, via said RAM bus, at least one third location of said data RAM.

44. A processor apparatus according to claim 43, wherein:

said data access port is further coupled to said program memory means, and said data access port writes to and/or reads from at least one location of said program memory means.

45. A processor apparatus according to claim 34, further comprising:

f) a probe for monitoring a desired address of said data RAM, for obtaining and converting data at said desired address into an analog signal and for supplying said analog signal to a means external said processor apparatus.

46. A processor apparatus according to claim 45, wherein:

said data RAM bus is comprised of a plurality of data lines and a plurality of address lines, and said probe comprises, comparator means coupled to said address lines of said data RAM bus for comparing said desired address of said data RAM which is to be probed with addresses appearing on said address lines of said data RAM bus, means for writing data appearing on said data lines of said data RAM bus to a predetermined location in said data RAM when said comparator means finds a match between said desired address and one of said addresses appearing on said address lines of said data RAM bus, means for reading said data written to said predetermined location of said data RAM, and means for converting said data read from said predetermined location of said data RAM into an analog signal.

47. A processor apparatus according to claim 41, further comprising:

g) a probe for monitoring a desired address of said data RAM, for obtaining and converting data at said desired address into an analog signal and for supplying said analog signal to means external said processor apparatus.

48. A processor apparatus according to claim 47, wherein:

said data RAM bus is comprised of a plurality of data lines and a plurality of address lines, and said probe comprises, comparator means coupled to said address lines of said data RAM bus for comparing said desired address of said data RAM which is to be probed with addresses appearing on said address lines of said data RAM bus, means for writing data appearing on said data lines of said data RAM bus to a predetermined location in said data RAM when said comparator means finds a match between said desired address and one of said addresses appearing on said address lines of said data RAM bus, means for reading said data written to said predetermined location of said data RAM, and means for converting said data read from said predetermined location of said data RAM into an analog signal.

49. A processor apparatus according to claim 43, further comprising:

j) a probe for monitoring a desired address of said data RAM, for obtaining and converting data at said desired address into an analog signal and for supplying said analog signal to means external said processor apparatus.

50. A processor apparatus according to claim 49, wherein:

said data RAM bus is comprised of a plurality of data lines and a plurality of address lines, and said probe comprises, comparator means coupled to said address lines of said data RAM bus for comparing said desired address of said data RAM which is to be probed with addresses appearing on said address lines of said data RAM bus, means for writing data appearing on said data lines of said data RAM bus to a predetermined location in said data RAM when said comparator means finds a match between said desired address and one of said addresses appearing on said address lines of said data RAM bus, means for reading said data written to said predetermined location of said data RAM, and means for converting said data read from said predetermined location of said data RAM into an analog signal.

51. A processor apparatus according to claim 32, wherein:

said at least one data signal receiving means comprises a plurality of data signal receiving means, said at least one output means coupled to said multiported central memory unit comprises a plurality of output means, each obtaining in a repeated sequential fashion said processed data signals from respective different second address locations of said multiported central memory unit, and for making said processed data signals available external to said processor apparatus, and said plurality of data signal receiving means and said plurality of output means each include interface means for making said plurality of data signal receiving means and said plurality of output ports compatible with the clocking and bit width of a plurality of different means external said processor apparatus.

52. A processor apparatus according to claim 40, wherein:

said at least one data signal receiving means comprises a plurality of data signal receiving means, said at least one output means coupled to said multiported central memory unit comprises a plurality of output means, each obtaining in a repeated sequential fashion said processed data signals from respective different second address locations of said multiported central memory unit, and for making said processed data signals available external to said processor apparatus, and said plurality of data signal receiving means and said plurality of output means each include interface means for making said plurality of data signal receiving means and said plurality of output ports compatible with the clocking and bit width of a plurality of different means external said processor apparatus.

53. A processor apparatus according to claim 50, wherein:

said at least one data signal receiving means comprises a plurality of data signal receiving means, said at least one output means coupled to said multiported central memory unit comprises a plurality of output means, each obtaining in a repeated sequential fashion said processed data signals from respective different second address locations of said multiported central memory unit, and for making said processed data signals available external to said processor apparatus, and said plurality of data signal receiving means and said plurality of output means each include interface means for making said plurality of data signal receiving means and said plurality of output ports compatible with the clocking and bit width of a plurality of different means external said processor apparatus.

54. A system comprising a plurality of said processor apparatuses of claim 37, wherein a first of said plurality of said processor apparatuses has its output means coupled to the data signal receiving means of at least a second of said plurality of said processor apparatus.

55. A system according to claim 54, wherein one of said processor apparatuses is a master processor apparatus, all other processor apparatuses being slave processor apparatuses, and wherein said master processor apparatus and said slave processor apparatuses all each further comprise f) a host port for receiving microinstructions for the respective processor apparatus; and g) a program bus coupling said host port and said program memory means of respective processor apparatuses, said host port being coupled to said data RAM via said data RAM bus of the respective processor apparatus, wherein said program memory means of respective slave processor apparatuses are programmed in a boot mode by forwarding said microinstructions from means external to said slave processor apparatuses through said host port, over said program bus and to said program memory means.

56. A system according to claim 55 in conjunction with a programmed ROM, said programmed ROM constituting said means external to said slave processor apparatuses and coupled to said master processor apparatus in boot mode, wherein said programmed ROM contains said microinstructions for said program memory means of said master processor apparatus and said slave processor apparatuses and further contains configuration information for said data RAM, said data signal receiving means, and said output means of said master and slave processor apparatuses, and parametric data for said data RAM of said master processor apparatus and said slave processor apparatuses, said microinstructions configuration information, and parametric data having been compiled into said programmed ROM, and wherein said master processor apparatus reads said microinstructions from said programmed ROM via the host port of said master processor apparatus and sends said microinstructions to respective program memory means of said master and slave processor apparatus for storage therein via respective program memory buses, and said master processor apparatus reads said configuration information from said programmed ROM via said master processor apparatus host port and sends said configuration information appropriately to said data RAM, said data signal receiving means, said means for writing data, and said output means of said respective master and slave processor apparatuses via respective data RAM buses, and said master processor apparatus reads said parametric data from said programmed ROM via said master processor apparatus host port and sends said parametric data to appropriate data RAMs of said respective master and slave processor apparatuses via respective data RAM buses.

57. A system according to claim 56, wherein:

said master processor apparatus further comprises a boot ROM, said boot ROM being coupled to said digital processor means of said master processor apparatus when said master processor apparatus is in boot mode, said boot ROM containing boot microcode for causing said digital processor means to control said host port of said master processor apparatus and to obtain said microinstructions, configuration information, and said parametric data from said programmed ROM.

58. A processor apparatus according to claim 55, wherein:

at least one of said master processor apparatus and said slave processor apparatuses includes a data access port coupled to a respective data RAM via a respective data RAM bus for writing to and/or reading from, via said data RAM bus, at least one location of the respective data RAM.

59. A processor apparatus according to claim 58, wherein:

said data access port is further coupled to a respective program memory means, and said data access port writes to and/or reads from at least one location of said respective program memory means.

60. A processor apparatus according to claim 55, wherein:

at least one of said master processor apparatus and said processor apparatuses includes a probe for monitoring a desired address of the data RAM of the respective processor apparatus of the probe, for obtaining and converting data at said desired address into an analog signal and for supplying said analog signal to a means external said processor apparatus.

61. A processor apparatus according to claim 60, wherein:

said data RAM buses of said master and slave processor apparatuses are comprised of a plurality of data lines and a plurality of address lines, and said probe comprises, comparator means coupled to said address lines of said respective data RAM bus for comparing said desired address of said RAM which is to be probed with addresses appearing on said address lines of said data RAM bus, means for writing data appearing on said data lines of said data RAM bus to a predetermined location in said data RAM when said comparator means finds a match between said desired address and one of said addresses appearing on said address lines of said data RAM bus, means for reading said data written to said predetermined location of said data RAM, and means for converting said data read from said predetermined location of said data RAM into an analog signal.

62. A system for implementing in substantially integrated circuit format different circuits defined by textual or graphical high level description, comprising:

a) a development system having 1) memory means storing a cell library, said cell library including a plurality of functional block elements useful in implementing said different circuits, each functional block defined by a set of instructions, 2) circuit definition entry means for choosing said functional block elements of said cell library and for defining interconnections between said functional block elements, said circuit definition entry means including means for entering parameters for a plurality of functional block elements chosen as part of a desired circuit, 3) processor means for compiling said set of instructions and said parameters according to a desired algorithm to create microcode for at least one signal processor apparatus whereby said at least one signal processor apparatus can thereby implement said desired circuit;

b) said signal processor apparatus, for receiving regularly clocked data signals generated external to said signal processor apparatus, for processing said data signals according to said microcode thereby generating processed data signals, and for making said processed data signals available as regularly clocked output signals having a data rate related to the data rate of said regularly clocked data signals to means external to said processor apparatus, said signal processor apparatus including 1) port means for receiving said regularly clocked data signals and for receiving said microcode from said development system, 2) a program memory including a program bus, said program memory coupled to said port means for receiving and storing said microcode, 3) a multiported central memory unit including a data bus, said multiported central memory unit coupled to said port means, said port means including means for forwarding said received data signals to desired locations in said multiported central memory unit, and said multiported central memory unit for storing said received data signals;

4) a digital processor means coupled to said multiported central memory unit and to said program memory, for obtaining said data signals from said multiported central memory unit, for processing said data signals according to said microcode stored in said program memory, and thereby generating processed data signals, and for sending said processed data signals for storage in said multiported central memory unit, and 5) an output means coupled to said multiported central memory unit, for obtaining said processed data signals from said multiported central memory unit, and for making said processed data signals available to said means external said processor apparatus as regularly clocked output signals having a data rate related to the data rate of said regularly clocked data signals.

63. A system according to claim 62, wherein:

said port means comprises a control port and a data signal receiving means, said control port coupled to said development system for receiving said microcode from said development system, and said data signal receiving means for receiving said data signals, said data signal receiving means including said means for forwarding.

64. A system according to claim 63, wherein:

said processor means for compiling further creates configuration information for configuring said data signal receiving means, said multiported central memory unit, and said output means, and parametric data for said multiported central memory unit.

65. A system according to claim 64, wherein:

said signal processor apparatus further comprises 7) a boot ROM, said boot ROM being coupled to said digital processor means when said processor apparatus is a master processor apparatus in boot mode, said boot ROM containing boot microcode for causing said digital processor coupled to said boot ROM to control said control port and to obtain said microinstructions, configuration information, and parametric data from said programmed ROM, and to forward said parametric data to said multiported central memory unit, said microinstructions to said program memory and said configuration information to said data signal receiving means, said multiported central memory unit, and said output means.

66. A system according to claim 65, wherein:

said signal processor apparatus further comprises 8) a data access port coupled to said multiported central memory unit via said data bus for writing to and/or reading from, via said data bus, at least one location of said multiported central memory unit.

67. A system according to claim 66, wherein:

said data access port is further coupled to said program memory, and said data access port writes to and/or reads from at least one location of said program memory.

68. A system according to claim 65, wherein:

said signal processor apparatus further comprises 8) a probe for monitoring a desired address of said multiported central memory unit, for obtaining and converting data at said desired address into an analog signal and for supplying said analog signal to means external said signal processor apparatus.

69. A system according to claim 64, further comprising:

c) a programmed ROM, said programmed ROM for receiving and holding said microinstructions for said program memory means, said configuration information for said multiported central memory unit, said data signal receiving means, and said output means, and parametric data for said data multiported central memory unit, said microinstructions, configuration information, and parametric data having been compiled into said programmed ROM by said processor means for compiling, and wherein in a master mode of said signal processor apparatus said signal processor apparatus reads said microinstructions from said programmed ROM via said control port and sends said microinstructions to said program memory means for storage therein via said program bus, reads said configuration information from said programmed ROM via said control port and sends said configuration information appropriately to said data multiported central memory unit, to said data signal receiving means, and to said output means via said data RAM bus, and reads said parametric data from said programmed ROM via said host port and sends said parametric data to said data RAM.

70. A system according to claim 65, further comprising:

c) a programmed ROM, said programmed ROM for receiving and holding said microinstructions for said program memory means, said configuration information for said multiported central memory unit, said data signal receiving means, and said output means, and parametric data for said data multiported central memory unit, said microinstructions, configuration information, and parametric data having been compiled into said programmed ROM by said processor means for compiling, and wherein in a master mode of said signal processor apparatus said signal processor apparatus reads said microinstructions from said programmed ROM via said control port and sends said microinstructions to said program memory means for storage therein via said program bus, reads said configuration information from said programmed ROM via said control port and sends said configuration information appropriately to said data multiported central memory unit, to said data signal receiving means, and to said output means via said data RAM bus, and reads said parametric data from said programmed ROM via said host port and sends said parametric data to said data RAM.

71. A system according to claim 64, wherein:

said at least one data signal receiving means comprises a plurality of data signal receiving means, said at least one output means coupled to said multiported central memory unit comprises a plurality of output ports, and said plurality of data signal receiving means and said plurality of ports each include interface means for making said plurality of data signal receiving means and said plurality of ports compatible with the clocking and bit width of a plurality of different means external said processor apparatus.

72. A system according to claim 71, wherein:

each of said plurality of data signal receiving means includes means for writing data to respective desired first addresses in said multiported central memory unit in a repeated sequential fashion, and each of said plurality of output ports includes means for obtaining in a repeated sequential fashion said processed data signals from respective second addresses of said multiported central memory unit.

73. A system according to claim 64, wherein:

said system includes a plurality of said signal processor apparatuses with the output means of a first of said plurality of said processor apparatuses being coupled to the data signal receiving means of at least a second of said plurality of said processor apparatuses, and wherein one of said processor apparatuses is a master processor apparatus, all other processor apparatuses are slave processor apparatuses.

74. A system according to claim 68, wherein:

said system includes a plurality of said signal processor apparatuses with the output means of a first of said plurality of said processor apparatuses being coupled to the signal data receiving means of at least a second of said plurality of said processor apparatuses, and wherein one of said processor apparatuses is a master processor apparatus, all other processor apparatuses are slave processor apparatuses, and said programmed ROM further holds microinstructions, configuration informatation, and parametric data for said slave processor apparatuses.

75. A system according to claim 74, wherein:

said at least one data signal receiving means comprises a plurality of data signal receiving means, said at least one output means coupled to said multiported central memory unit comprises a plurality of output ports, and said plurality of data signal receiving means and said plurality of ports each include interface means for making said plurality of data signal receiving means and said plurality of ports compatible with the clocking and bit width of a plurality of different means external said processor apparatus.

76. A processor apparatus according to claim 75, wherein:

each of said plurality of data signal receiving means includes means for writing data to respective desired first addresses in said multiported central memory unit in a repeated sequential fashion, and each of said plurality of output ports includes means for obtaining in a repeated sequential fashion said processed data signals from respective second addresses of said multiported central memory unit.

77. A method for processing information in a real time signal processor apparatus designed for semiconductor integration, said processor apparatus having a data signal receiving means for receiving regularly clocked data signals from a means external to said processor apparatus, a multiported central memory unit coupled to said data signal receiving means, a digital processor means coupled to said multiported central memory unit, and at least one output port coupled to said multiported central memory unit, said method comprising for an operating mode of said processor apparatus:

a) receiving said regularly clocked data signals at said data signal receiving means;

b) forwarding said received data signals in a repeated sequential fashion to a plurality of desired first locations in said multiported central memory unit;

c) causing said digital processor means to obtain said data signals from said multiported central memory unit;

d) processing said data signals in said digital signal processor to generate processed data signals;

e) sending said processed data signals from said digital processor means to said multiported central memory unit for storage in desired second locations in said multiported central memory unit;

f) causing said output port to obtain said processed data signals from said desired second locations in a repeated sequential fashion and to make said processed data signals available to means external to said processor apparatus as regularly clocked output signals having a data rate related to said regularly clocked data signals, wherein substantially all signal data received by said processor apparatus flow directly from said at least one said data signal receiving means to said multiported central memory unit and said digital processor means obtains data signals for processing substantially only from said multiported central memory unit and provides said processed data signals substantially only to said multiported central memory unit.

78. A method according to claim 77, wherein:

said multiported central memory unit comprises a data RAM and a data RAM bus, and said steps b), c), e), and f) are accomplished in a time division multiplexed manner using said data RAM bus.

79. A method according to claim 77, wherein:

said multiported central memory unit comprises a data RAM and a data RAM bus, said processor apparatus further comprises a program memory means and a program bus, said program memory means coupled to said digital processor, said program memory means for storing microinstructions for controlling said digital processor, and said digital processor processes said data signals in said processing step according to said microinstructions stored in said program memory.

80. A method according to claim 77, wherein:

said processor apparatus comprises a plurality of data signal receiving means, and a plurality of output ports, and said steps a)–f) set up a plurality of data paths through said processor apparatus.

81. A method according to claim 78, wherein:

said multiported central memory unit comprises a data RAM and a data RAM bus, said processor apparatus further comprises a program memory means and a program bus, a plurality of data signal receiving means, and a plurality of output ports, said program memory means coupled to said digital processor for storing microinstructions for said digital processor, and said digital processor processes said data signals in said processing step according to said microinstructions stored in said program memory, and steps a)–f) set up a plurality of data paths through said processor apparatus, utilizing said plurality of output ports and said plurality of data signal receiving means.

82. A method according to claim 79, wherein:

said processor apparatus further comprises a logic control port, said logic control port being coupled to a program memory means for storing said microinstructions, said method further comprising for a boot-up mode of said processor apparatus, reading, via said logic control port during boot-up mode, said microinstructions from an external programmed memory; and forwarding said microinstructions for storage in said program memory means of said processor apparatus.

83. A method according to claim 82, wherein:

the programmed memory external said processor apparatus further stores configuration information for said data RAM, said data signal receiving means, and said output port, and parametric data for said data RAM, said microinstructions, configuration information, and parametric data having been compiled into the programmed memory external said processor apparatus, said method further comprising for a boot-up mode of said processor apparatus where said processor apparatus is a master processor apparatus, reading said configuration information from the external programmed memory means via said logic control port, sending said configuration information appropriately to said data RAM, to said data signal receiving means, and to said output means via said data RAM bus, and reading said parametric data from the external programmed memory via said logic control port, and sending said parametric data to said data RAM via said data RAM bus.

84. A method according to claim 83, wherein:

said master processor apparatus further comprises a boot ROM coupled to said digital processor means in a boot mode, said boot ROM containing boot mode microinstructions for causing said digital processor means to control said logic control port so as to obtain said microinstructions, configuration information, and said parametric data from the external programmed memory.

85. A method according to claim 77, wherein:

said multiported central memory unit comprises a data RAM and a data RAM bus, and said processor apparatus further comprises a data access port coupled to said data RAM bus, said method further comprising, reading via said data access port either data signals or processed data signals from a desired location in said data RAM, and writing via said data access port replacement data signals for said data signals or processed data signals.

86. A method according to claim 77, wherein:

said multiported central memory unit comprises a data RAM and a data RAM bus having data and address lines, and said processor apparatus further comprises a probe port having address comparator means coupled to said address lines of said data RAM bus, said method further comprising, monitoring a desired address to be probed of said data RAM by comparing information appearing on said address lines of said data RAM bus with information representing said desired address, writing data appearing on said data lines of said data RAM bus to a predetermined location in said data RAM when said address comparator means finds a match between said desired address and one of said addresses appearing on said address lines of said data RAM bus, reading said data written to said predetermined location of said data RAM, converting said data read from said predetermined location of said data RAM into an analog signal.

87. A method according to claim 79 utilizing a plurality of said processor apparatuses, wherein one of said processor apparatuses is a master processor apparatus, all other processor apparatuses being slave processor apparatuses, and a first of said processor apparatuses has an output port coupled to a data signal input port of a second of said processor apparatuses, said master and slave processor apparatuses each including a logic control port coupled to an external programmed memory, and said master processor apparatus including a boot ROM coupled to said digital processor means in a boot mode, said boot ROM containing boot mode microinstructions for causing said digital processor means to control said logic control port of said master processor apparatus, said method further comprising in a boot-up mode of said processor apparatuses:

reading, via said logic control port of said master processor apparatus said microinstructions, configuration information, and parametric data from an external programmed memory;

sending appropriate of said microinstructions to said program memory means of said master processor apparatus, and other appropriate microinstructions to the program memory means of respective slave processor apparatuses via respective logic control ports;

sending said configuration information appropriately to respective of said data RAMs, said data signal receiving means, and said output means of said master and slave processor apparatuses via respective of said data RAM buses, and sending said parametric data appropriately to respective of said data RAMs of said master and slave processor apparatuses via respective of said data RAM buses.

* * * * *